US007623070B2

(12) United States Patent
Roh

(10) Patent No.: US 7,623,070 B2
(45) Date of Patent: *Nov. 24, 2009

(54) CROSS-CORRELATION MITIGATION METHOD AND APPARATUS FOR USE IN A GLOBAL POSITIONING SYSTEM RECEIVER

(75) Inventor: Mark Charles Roh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/737,266

(22) Filed: Apr. 19, 2007

(65) Prior Publication Data

US 2008/0129585 A1 Jun. 5, 2008

Related U.S. Application Data

(63) Continuation of application No. 10/979,918, filed on Nov. 1, 2004, now Pat. No. 7,209,076, which is a continuation-in-part of application No. 10/618,184, filed on Jul. 10, 2003, now abandoned.

(60) Provisional application No. 60/395,217, filed on Jul. 10, 2002.

(51) Int. Cl.
*G01S 5/14* (2006.01)

(52) U.S. Cl. .................. 342/357.15; 342/357.1
(58) Field of Classification Search ............ 342/357.02, 342/357.1, 357.15
See application file for complete search history.

(56) References Cited

U.S. PATENT DOCUMENTS 6,236,354 B1 * 5/2001 Krasner ............... 342/357.06

(Continued)

FOREIGN PATENT DOCUMENTS

WO 04005954 1/2004

(Continued)

OTHER PUBLICATIONS

Ziedan et anl, "Unadided Acquisition of Weak GPS Signals Using Circular Correlation or Double Block Padding," PLANS 2004, Apr. 26-29, 2004, pp. 461-470.*

(Continued)

*Primary Examiner*—Gregory C Issing
(74) *Attorney, Agent, or Firm*—Linda G. Gunderson; Linda G. Gunderson

(57) ABSTRACT

A method and apparatus mitigating the effects of cross-correlation signals on received satellite signals in a Global Positioning System (GPS) receiver is described. MS-Assisted and MS-Based cross-correlation detection and mitigation methods and apparatus are described. A GPS search mode architecture is used to detect SV signals and identify potential cross-correlations. The GPS search modes have different coherent integration lengths and different degrees of sensitivity. After detection, measurements are logged into a database for further processing. Several cross-correlation tests are described. For example, a "Mainlobe" cross-correlation test is described that identifies the most significant cross-correlations that occur when the Doppler difference between the interfering SV signal and the target SV signal is nonzero and a multiple of 1 kHz. Appropriate C/No and Doppler thresholds, or masks, are selected and used to identify the mainlobe cross-correlations. A wide Doppler mask is used to account for the effects on cross-correlations caused by BPSK data bit modulation. Appropriate MS-Assisted and MS-Based cross-correlation masks are described. Other cross-correlation tests include "variable C/No", "strong", "wide Doppler" and "preemptive" cross-correlation detection tests.

32 Claims, 19 Drawing Sheets

U.S. PATENT DOCUMENTS

| | | | |
|---|---|---|---|
| 6,282,231 B1 * | 8/2001 | Norman et al. | 375/144 |
| 6,466,161 B2 * | 10/2002 | Turetzky et al. | 342/357.06 |
| 6,529,829 B2 | 3/2003 | Turetzky et al. | |
| 6,873,910 B2 * | 3/2005 | Rowitch et al. | 701/213 |
| 7,002,514 B2 * | 2/2006 | Basch et al. | 342/357.15 |
| 7,209,076 B2 * | 4/2007 | Roh | 342/357.12 |

FOREIGN PATENT DOCUMENTS

| | | |
|---|---|---|
| WO | 04017089 | 2/2004 |

OTHER PUBLICATIONS

International Search Report - PCT/US05/038411 - International Search Authority - European Patent Office - May 10, 2006.

Written Opinion - PCT/US05/038411 - International Search Authority - European Patent Office - May 10, 2006.

International Preliminary Report on Patentability - PCT/US05/038411 - The International Bureau of WIPO - Switzerland - May 1, 2007.

Kaplan et al., "Understanding GPS: Principles and Applications", 1996, pp. 83-236, Artech House, Massachusettes, USA.

* cited by examiner

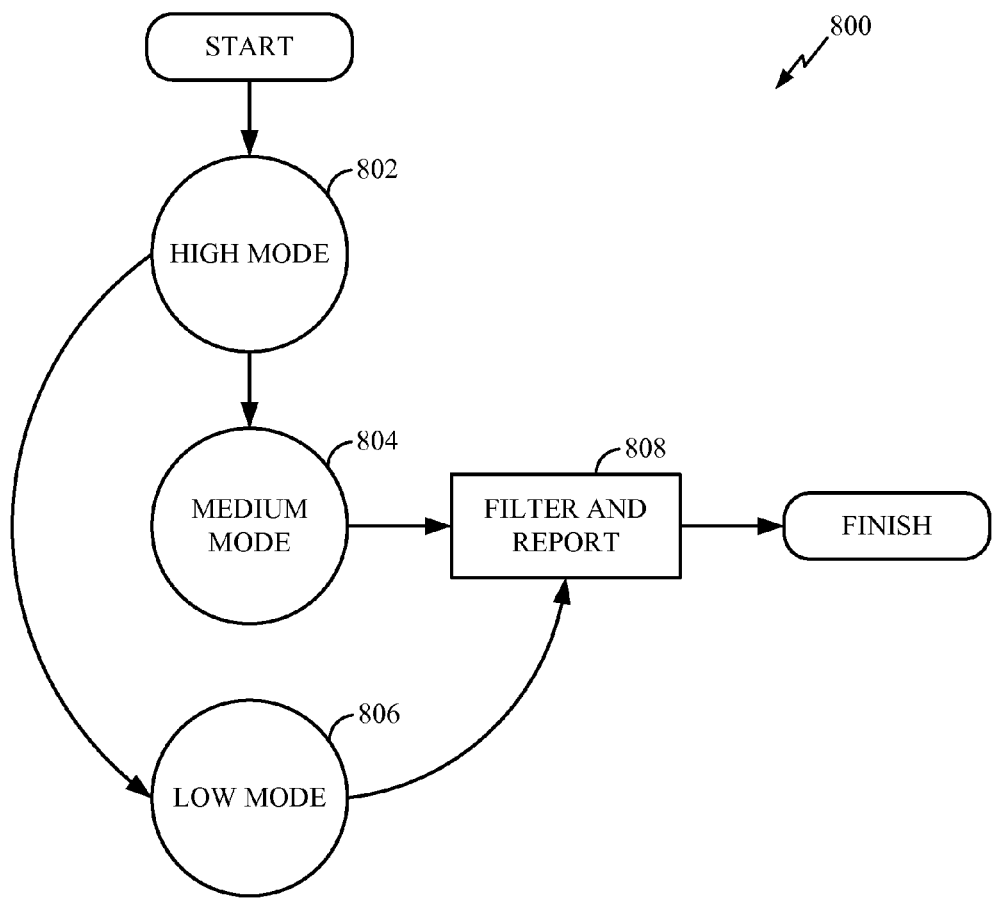
FIG. 8A - GPS SEARCH MODE ARCHITECTURE STATE MACHINE

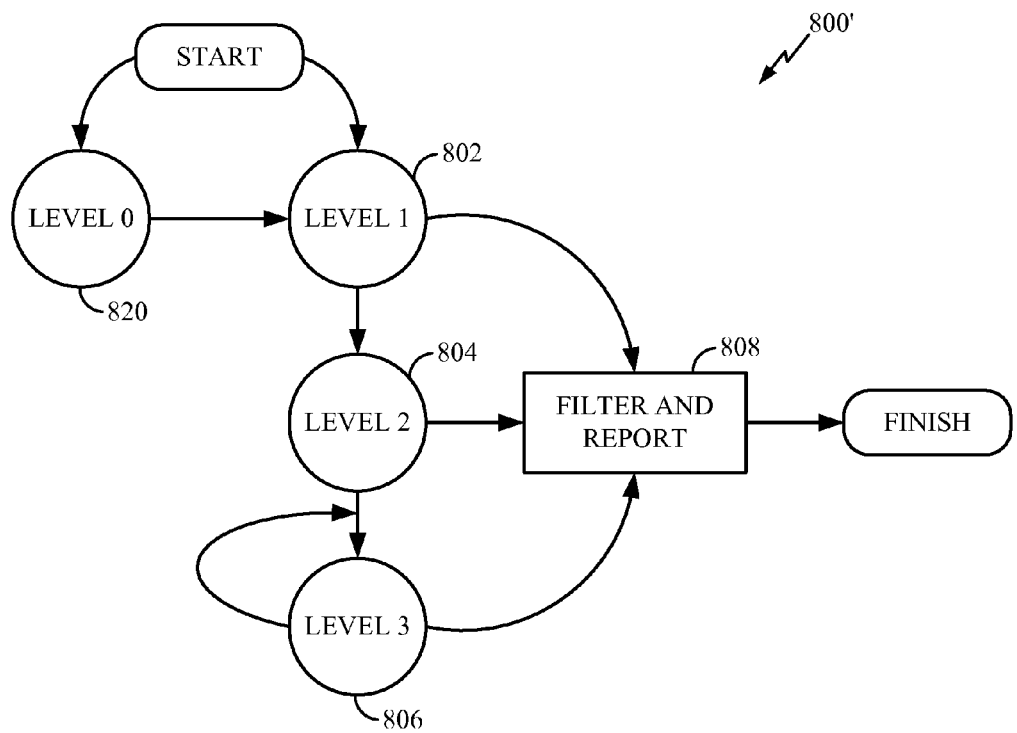
FIG. 8B - GPS SEARCH MODE ARCHITECTURE STATE MACHINE

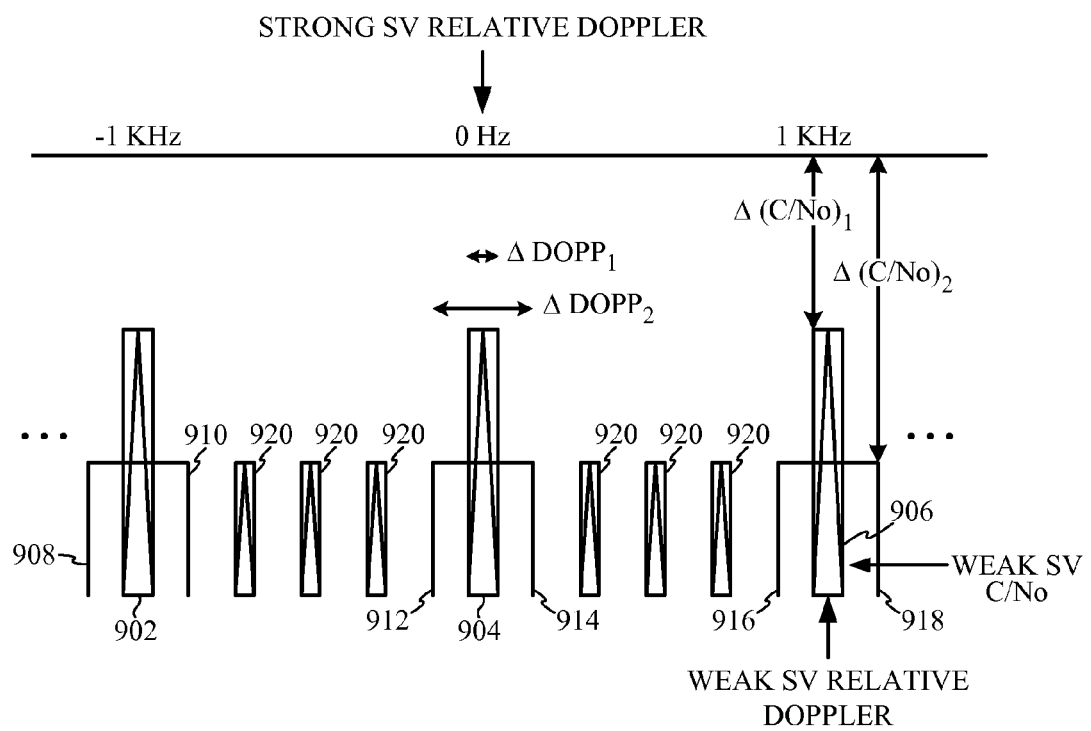
FIG. 9 - CROSS-CORRELATION DETECTION REGIONS FOR HIGH AND MEDIUM SEARCH MODES

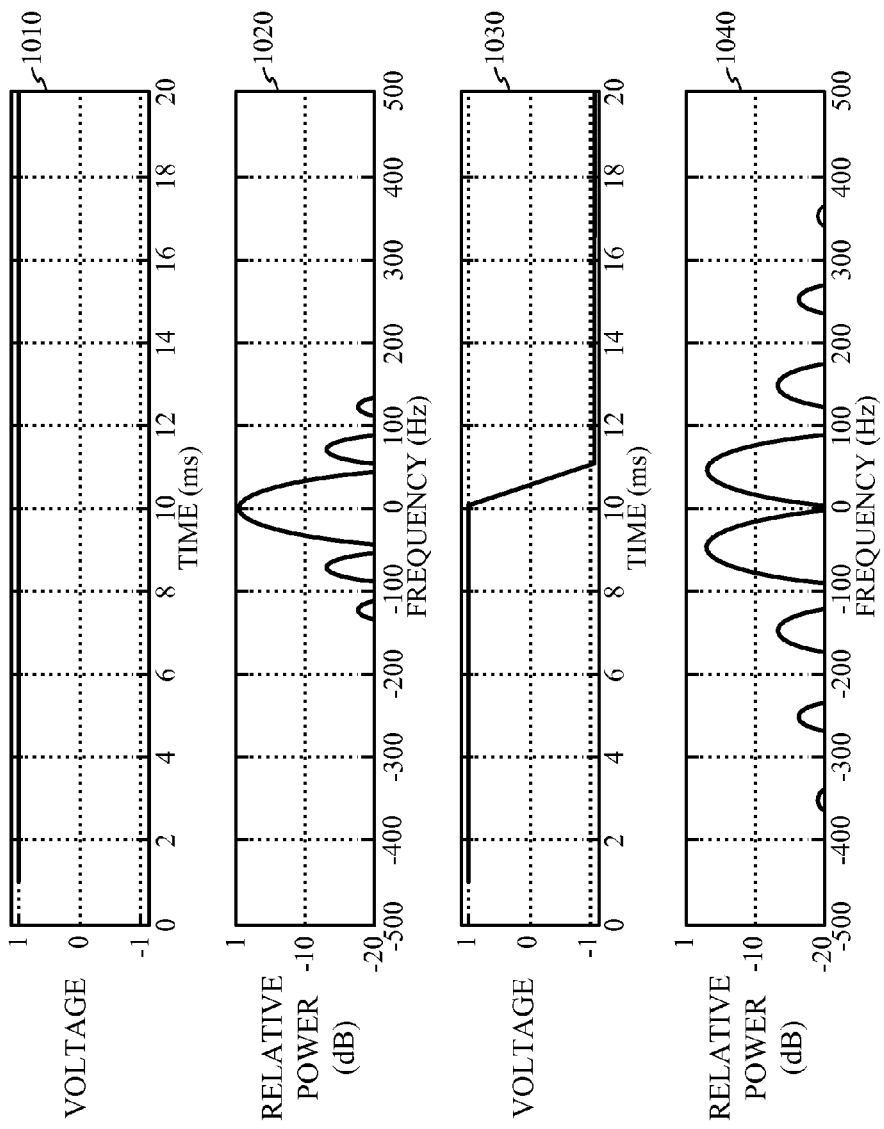
FIG. 10 - FREQUENCY RESPONSES OF TWO DIFFERENT INPUT SEQUENCES (20 ms COHERENT INTEGRATION).

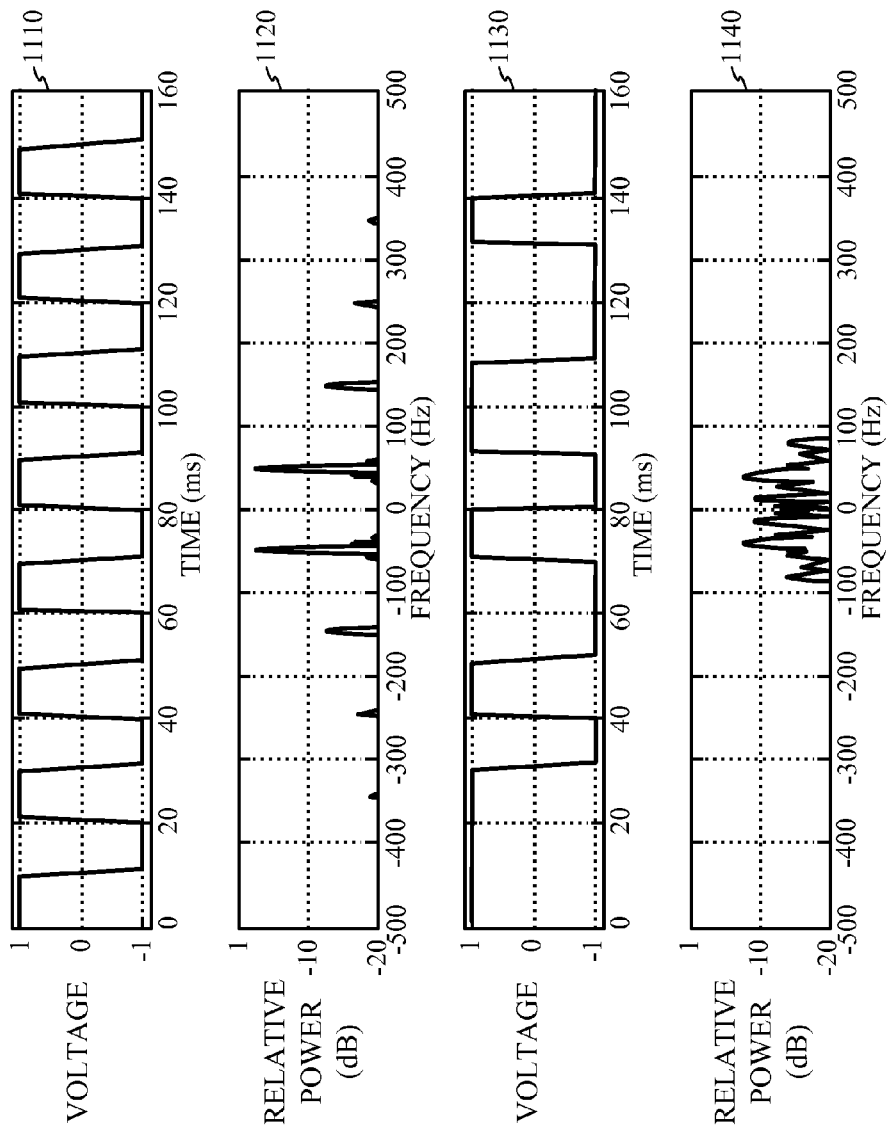
FIG. 11 - FREQUENCY RESPONSES OF TWO DIFFERENT INPUT SEQUENCES (160 ms COHERENT INTEGRATION).

CROSS-CORRELATION MITIGATION METHOD AND APPARATUS FOR USE IN A GLOBAL POSITIONING SYSTEM RECEIVER

RELATED APPLICATIONS—CLAIM OF PRIORITY TO PRIOR APPLICATIONS

This application is a continuation of U.S. patent application Ser. No. 10/979,918, which was filed on Nov. 1, 2004, which claims the benefit of a Continuation-in-Part of U.S. application Ser. No. 10/618,184, filed Jul. 10, 2003, pending, which claims the benefit of U.S. Provisional Application No. 60/395,217, filed on Jul. 10, 2002.

BACKGROUND

1. Field

This disclosure relates generally to the field of global positioning system (GPS) receivers, and more particularly to a method and apparatus for mitigating satellite signal interference in a GPS receiver.

2. Description of Related Art

As is well known in the field of global positioning system (GPS) design, GPS receivers determine their position by computing the relative times of arrival (TOA) of signals that are simultaneously transmitted from a plurality of GPS satellites (also referred to herein as Space Vehicles ("SVs")) orbiting the earth. As described in a related U.S. patent, U.S. Pat. No. 6,236,354, issued on May 22, 2001 to Krasner (referred to hereafter as the '354 patent), and incorporated by reference herein in its entirety, GPS satellites transmit satellite positioning data and clock timing data (this data is referred to in the GPS art as "ephemeris" data).

As described in the incorporated '354 patent, GPS receivers determine pseudoranges to various the GPS space vehicles (SVs), and compute the position of the receiver using the calculated pseudoranges and satellite timing/ephemeris data. The pseudoranges are time delay values measured between the received signal from each SV and a local clock signal. The satellite ephemeris and timing data is extracted from the GPS signal once it is acquired and tracked. Acquiring GPS signals can take up to several minutes and must be accomplished using a sufficiently strong received signal in order to achieve low error rates.

The GPS SVs transmit two carrier frequencies called L1, the primary frequency, and L2, the secondary frequency. The carrier frequencies transmitted by each SV are modulated by spread spectrum codes with a pseudorandom noise (PRN) code (also referred to herein as a PN sequence) that is unique to each SV and by the navigation data message. All of the SVs transmit using the same two carrier frequencies, however, their signals normally do not significantly interfere with each other because of the unique PRN code modulation. Because each GPS SV is assigned a unique PRN code and because all of the PRN code sequences are nearly uncorrelated with respect to each other, the SV signals can be separated and decoded using the well known code division multiple access (CDMA) data transmission technique.

The PRN codes available for civilian GPS applications are referred to as C/A (coarse/acquisition) codes, and have a binary phase-reversal rate, or "chipping" rate, of 1.023 MHz and a repetition period of 1023 "chips" for a code period of 1 millisecond. The terms "chip" and "chipping" are used, instead of the term "bit", to indicate that no data information is contained in the PRN codes. The code sequences belong to a family known as "Gold" codes, and each GPS satellite broadcasts a signal having a unique Gold code.

In simple terms, for a signal received from a given GPS satellite, a receiver multiplies the received signal by a stored replica of the appropriate Gold code contained within its local memory, and then integrates the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition" of the signal. Once signal acquisition occurs, the process enters a "tracking" phase in which the timing of the local reference is adjusted in small amounts in order to maintain a high correlation output.

In order to acquire and track one SV that is in common view with several other SVs, a GPS receiver typically replicates the PRN code for the desired SV together with the replica carrier signal, including Doppler effects caused by Doppler shifts in the carrier frequency. The GPS signal acquisition and tracking process is therefore a "two-dimensional" (code and carrier) signal replication process, wherein both the SV PRN code and carrier frequency are replicated. For example, when acquiring and tracking the SV signal in the "code-phase" dimension, the GPS receiver first replicates the PRN code transmitted by the SV to be acquired, and then the GPS receiver shifts the phase of the replicated code until it correlates with the SV PRN code. Maximum correlation occurs when the phase of the GPS receiver replica code matches the phase of the incoming SV PRN code. Minimum correlation occurs when the phase of the replica code is offset by more than one chip on either side of the incoming SV PRN code.

GPS receivers also detect the SV transmitted signals in a "carrier-phase" dimension. GPS receivers accomplish carrier-phase dimension acquisition and tracking by replicating the SV carrier frequency including Doppler shifts to the carrier frequency. As is well known, the Doppler-induced effects are due to line-of-sight relative dynamics between the receiver and the SV. If the receiver does not simultaneously adjust (or tune) its replica carrier signal during the code-phase (or range-phase) dimension acquisition and tracking process so that the replica carrier signal matches the frequency of the desired SV carrier, the signal correlation process in the code-phase dimension is severely attenuated by the resulting frequency response roll-off characteristics of the GPS receiver. This has the consequence that the receiver never acquires the SV.

Further, if the SV signal is successfully initially acquired because the SV code and carrier frequency are successfully replicated during an initial search process, but the receiver subsequently loses track of the SV carrier frequency, then the receiver loses code track as well. Therefore, in the carrier Doppler frequency dimension (i.e., in the carrier-phase dimension), the GPS receiver accomplishes carrier matching (also referred to as "wipeoff") by first searching for the carrier Doppler frequency of the desired SV and then tracking the SV carrier Doppler state. The GPS receiver typically performs this process by adjusting a nominal carrier frequency of its replica carrier frequency generator to compensate for Doppler-induced effects on the SV carrier signal caused by line-of-sight relative dynamics between the receiver and the SV.

Global Positioning Systems use a multiplicity of satellites to concurrently transmit signals to a GPS receiver to permit position location of the receiver by measurement of differences in times-of-arrival between the multiple transmitted signals. In general, the signals transmitted from the different satellites do not significantly interfere with one another, because they use different PRN codes, unique to each satellite, wherein the PRN codes are nearly orthogonal to one another. This low interference condition depends upon the power levels (amplitudes) of the received signals being similar to one another.

Under certain operating conditions, however, one or more satellite signals can be highly attenuated relative to the other satellite signals. Such an operating condition may arise, for example, from the blockage of certain satellite signals, as may occur in urban canyon environments. Under these conditions, the presence of the strong GPS signals produces interference that can reduce the ability to detect and track weaker GPS signals. As described in an excellent text on GPS systems, entitled *Understanding GPS Principles and Applications*, edited by Elliott D. Kaplan, published by Artech House, Inc. in 1996, and incorporated herein for its teachings on GPS systems and receivers (referred to hereafter as the "Kaplan" text), because the GPS C/A-code length is a compromise at 1,023 chips, the cross-correlation properties (i.e., the cross-correlation between the unique PRN codes) can be poor under certain operational conditions. Table 1 below shows the C/A-code cross-correlation power for zero Doppler differences between any two codes. Table 1 is adopted from Table 4.7 of the incorporated Kaplan text (appearing at page 115), however it has been revised to reflect the results of simulations performed by the inventors.

As is well known in the GPS receiver design art, cross-correlation spurs are generated when an interfering SV transmits at certain frequencies relative to the search frequency of the target SV. As shown in Table 1 below, when the Doppler difference is zero Hz, the cross-correlation power adopts one of three specific values, relative to the power of the stronger SV (assuming that chip boundaries are synchronized for the two SVs). The C/A-code cross-correlation functions have peak levels that can be as poor as −24 dB with respect to its maximum autocorrelation for a zero Doppler difference between any two codes.

TABLE 1

| C/A-Code Maximum Cross-Correlation Power (Zero Doppler Differences) | |
| --- | --- |
| Cumulative Probability of Occurrence | Cross-Correlation for Any Two Codes (dB) |
| .12 | −23.9 |
| .25 | −24.2 |
| 1.00 | −60.2 |

Because the C/A codes have a period equal to 1 ms, the most significant cross-correlations occur when the Doppler difference between interfering SV and the target SV is a multiple of 1 kHz. There are also weaker cross-correlations at other frequencies. Table 2 (reproduced from Table 4.8, on page 116, of the incorporated Kaplan text) below shows the cross-correlation distribution for Doppler differences of 1, 2, 3, 4 and 5 kHz. As shown in Table 2, when the Doppler difference is nonzero and a multiple of 1 kHz, the worst-case cross-correlation power is −21.1 dB (relative to the interfering SV).

TABLE 2

| C/A-Code Maximum Cross-correlation Power for Two SV's with Nonzero Doppler Differences (Increments of 1 kHz Doppler Differences) | | | | | |
| --- | --- | --- | --- | --- | --- |
| Cumulative Probability of Occurrence | Cross-Correlation @ $\Delta$ = 1 kHz (dB) | Cross-Correlation @ $\Delta$ = 2 kHz (dB) | Cross-Correlation @ $\Delta$ = 3 kHz (dB) | Cross-Correlation @ $\Delta$ = 4 kHz (dB) | Cross-Correlation @ $\Delta$ = 5 kHz (dB) |
| 0.001 | −21.1 | −21.1 | −21.6 | −21.1 | −21.9 |
| 0.02 | −24.2 | −24.2 | −24.2 | −24.2 | −24.2 |
| 0.1 | −26.4 | −26.4 | −26.4 | −26.4 | −26.4 |
| 0.4 | −30.4 | −30.4 | −30.4 | −30.4 | −30.4 |

This cross-correlation can cause false acquisitions under certain Doppler difference and antenna gain conditions. For example, as described in the incorporated Kaplan text, an unwanted SV can have a C/A-code signal that is approximately 7 dB stronger than the desired SV C/A-code signal. If the desired SV is low on the horizon, increased multi-path loss is present, as well as reduced GPS receiver antenna gain, which results in a typical net loss of 4 dB. If the unwanted SV is higher in elevation, the atmospheric loss is reduced and there is increased GPS receiver antenna gain. This results in a typical net gain of 3 dB. The difference in SV elevations reduces the signal separation by an additional 7 dB. The antenna SV array gain variations as a function of the differences in user elevation angles to the two SVs also contribute up to an additional 2 dB of gain to the unwanted stronger SV signal. Under signal conditions between the two SVs where there is only 21 dB of C/A-code discrimination during the cross-correlation process, the difference between the desired SV signal and the unwanted signal is only 5 dB (21 dB−16 dB).

As a consequence of these cross-correlations, the GPS receiver may falsely acquire the stronger SV signal. Therefore, a method of discriminating and mitigating these cross-correlation effects in a GPS receiver is desired. The GPS receiver design should implement sophisticated C/A-code search procedures that avoid "sidelobe" and unwanted SV acquisitions. However, the cross-correlation mitigation method and apparatus should be inexpensively and easily implemented in a GPS receiver.

SUMMARY

A method and apparatus mitigating the effects of cross-correlation signals on received satellite signals in a Global Positioning System (GPS) receiver is described. A GPS receiver receives a plurality of satellite signals from respective and associated plurality of GPS satellite vehicles (SVs). MS-Assisted and MS-Based cross-correlation detection and mitigation methods and apparatus are described. Inventive GPS search mode architectures are used to detect SV signals and identify potential cross-correlations. In one embodiment, the GPS search mode architecture includes different levels of search modes, each having different coherent integration lengths and different degrees of sensitivity. Relatively fast high mode searches (having short coherent integration lengths) are first performed to detect strong SV signals, followed by deeper search modes (having longer coherent integration lengths) if required to detect weaker SV signals. After detection, measurements are logged into a database for further processing. Several cross-correlation tests may then be performed to mitigate the detrimental effects of cross-correlations on received SV signals.

A "Mainlobe" cross-correlation test is described that identifies the most significant cross-correlations that occur when the Doppler difference between the interfering SV signal and the target SV signal is nonzero and a multiple of 1 kHz. C/No measurements of all SVs are compared in a pairwise fashion to identify cross-correlations. Appropriate C/No and Doppler thresholds, or masks, are selected and used to identify the mainlobe cross-correlations. Frequency sidelobes and sample-and-hold cross-correlations are also identified using appropriate C/No and Doppler mask pairs. A wider Doppler mask is used to account for the effects on cross-correlations introduced by BPSK data bit modulation. Appropriate MS-Assisted and MS-Based cross-correlation masks are described. In typical GPS systems, the data bits are modulated with a period of 20 ms. This has the effect of reducing cross-correlation power after coherent integration. To account for the effects of data bit modulation upon cross-correlation signals, different C/No and Doppler masks are used in implementing the cross-correlation tests.

A "variable C/No" cross-correlation test is described to account for the effects on cross-correlations when the Doppler difference between an interfering SV and a target SV is high. Because GPS code Doppler spreads out cross-correlation energy across multiple code phases when Doppler difference is high, stricter C/No thresholds can be used when the Doppler difference between the target SV signal and the weaker measurement is high.

A "strong" cross-correlation test is used to detect combined cross-correlations generated when two or more signals fall very close to each other in both code phase and Doppler frequency. The strong correlation test requires that at least two SV signals fall within the Doppler and C/No masks before the detected peak is identified as a cross-correlation. The thresholds are reduced to account for the combined strong cross-correlation signal. A "wide Doppler" test presented herein addresses a similar scenario as that addressed by the strong cross-correlation test, however the wide Doppler test is used when multiple SVs concurrently transmit signals that are relatively close in Doppler frequency, but not sufficiently close as to produce a cross-correlation peak of very strong energy. In accordance with the "wide Doppler" test, if at least two SV signals fall into a Doppler, C/No mask, the energy peak is identified as a cross-correlation. However, the width of the Doppler mask is greater than the Doppler mask used by the other cross-correlation tests. In addition, the peak Doppler value must lie between the Doppler values of the two cross-correlation signals.

A pre-emptive cross-correlation test is described that performs cross-correlation testing early in the SV signal search process. The pre-emptive cross-correlation testing method prevents erroneous, or at least undesired, deletion of true energy peaks prior to the performance of cross-correlation testing. In accordance with the pre-emptive cross-correlation embodiment disclosed herein, cross-correlations are identified during the energy peak selection process.

Embodiment details and some alternatives are set forth in the accompanying drawings and the description below. Because all embodiments of the invention cannot reasonably be described herein, the described embodiments must be understood as illustrating, rather than limiting, the invention.

BRIEF DESCRIPTION OF THE DRAWINGS

FIG. 8a is a simplified high-level state machine of a first embodiment of the GPS search mode architecture.

FIG. 8b is a simplified high-level state machine of a second embodiment of the GPS search mode architecture.

FIG. 9 is a waveform showing cross-correlation detection regions for high and medium search modes in accordance with the GPS search mode architectures of FIGS. 8a and 8b.

FIG. 10 displays waveforms showing how the frequency response of received signals change in the presence of data bit modulation such as BPSK modulation.

FIG. 11 displays received signal frequency responses resulting from an exemplary transmitted data bit sequence.

Like reference numbers and designations in the various drawings indicate like elements throughout.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

A method and apparatus for mitigating cross-correlation between received satellite signals in a Global Positioning System (GPS) receiver is described.

GPS Receiver System

Figure 1:
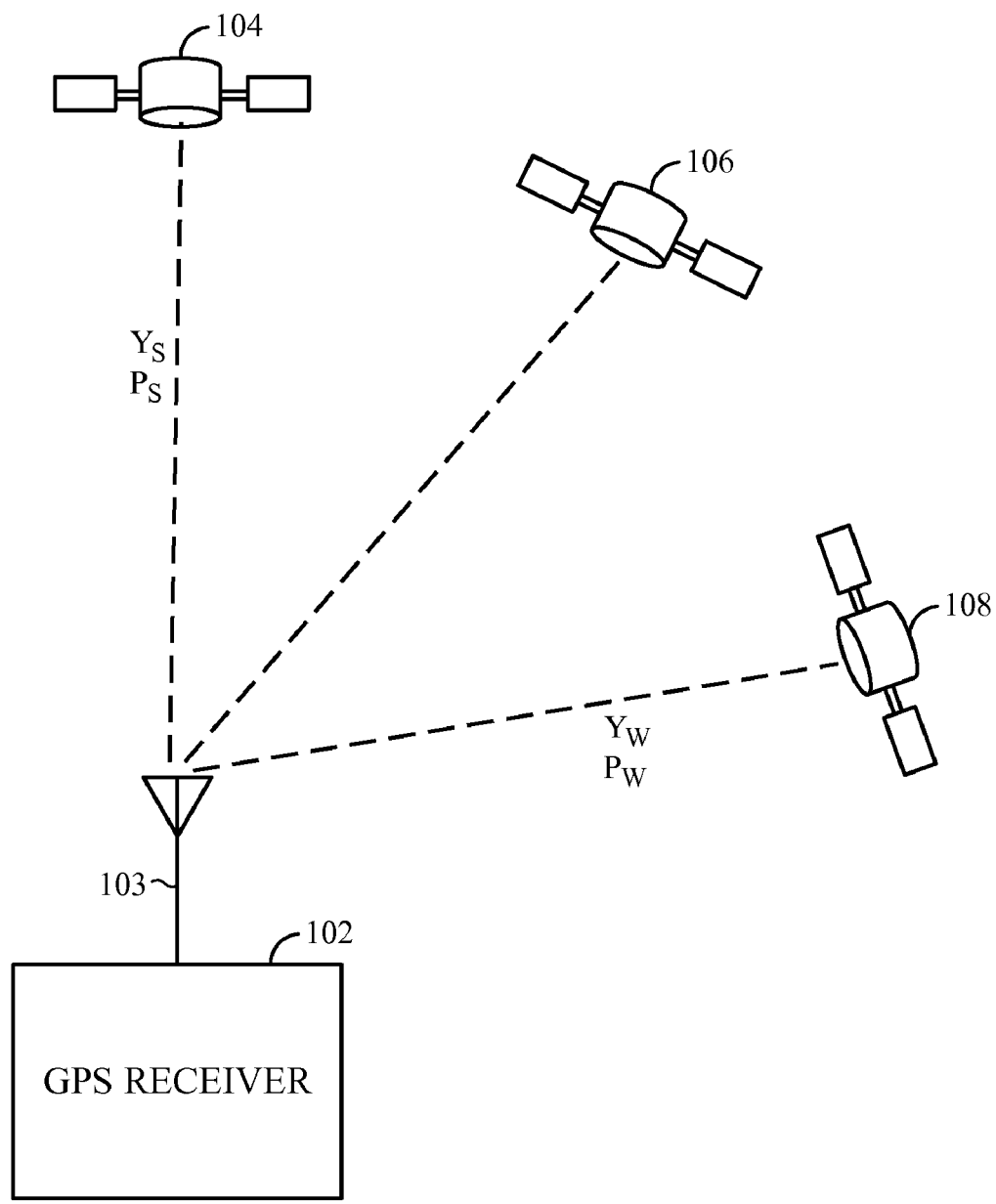
FIG. 1 shows a prior art GPS system.

FIG. 1 shows a prior art GPS system 100 in which a GPS receiver 102 receives GPS signals through a GPS antenna 103 from a number of in-view GPS satellites 104 through 108. The prior art GPS system 100 is reproduced from FIG. 1 of the incorporated '354 patent. Although not limited for use in the GPS system 100 of FIG. 1, the cross-correlation mitigation method and apparatus of this application can be practically applied in one embodiment to reduce cross-correlation of received satellite signals in the GPS system 100 shown in FIG. 1. The signal transmitted by the satellite 104 to the receiver 102 is denoted "$Y_S$", and the signal transmitted by the satellite 108 to the receiver 102 is denoted "$Y_W$". For purposes of the following description, it is assumed that the signal received from the satellite 104 is significantly stronger than the signal received from the satellite 108.

Figure 2:
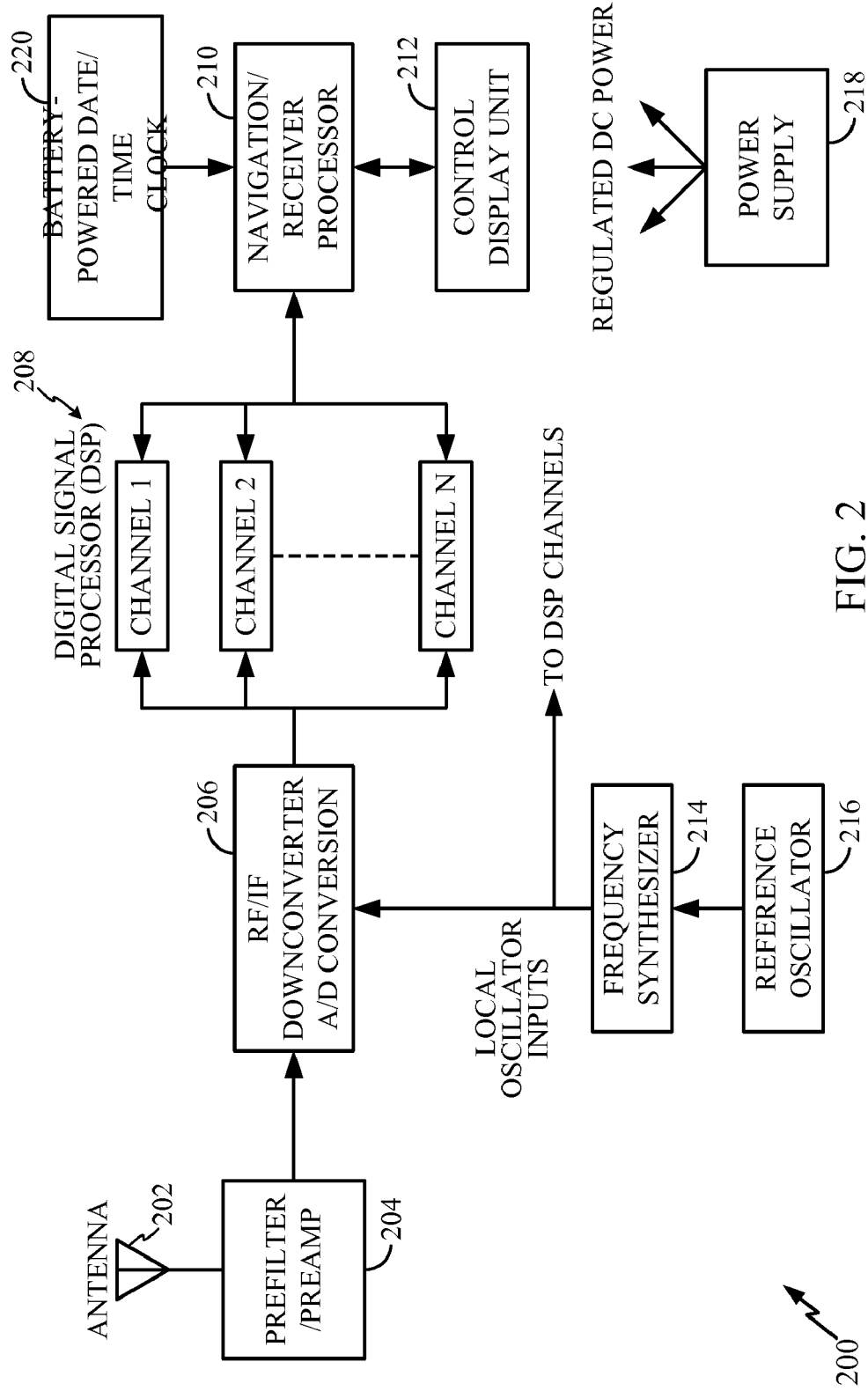
FIG. 2 is a simplified block diagram of a multi-channel GPS receiver.

FIG. 2 is a simplified block diagram of a multi-channel GPS receiver 200. The multi-channel GPS receiver 200 incorporates circuitry that reduces interference effects from strong and weak satellite signals, such as signals $Y_S$ and $Y_W$, in FIG. 1. Most GPS receivers have multiple channels wherein each channel tracks the transmission from a single satellite. As shown in FIG. 2, the RF CDMA satellite signals are received from a GPS antenna 202 and input to a pre-filter/preamplifier circuit 204. The pre-filter 204 filters the incoming signals (typically by bandpass filtering the signals) to reduce out-of-band RF interference. The filtered and amplified signals are then downconverted from the RF frequency to an intermediate frequency (IF). The RF/IF downconverter and A/D conversion circuit 206 translates the signal to a suitable intermediate frequency, for example 70 MHz. It then provides a further translation to a lower intermediate frequency, for example 1 MHz. In most modern GPS receiver designs, such as the receiver 200 of FIG. 2, the IF signals are sampled and digitized by an analog to digital (A/D) converter. The GPS receiver 200 performs A/D conversion of the downconverted RF signal using the A/D converter 206. The A/D sampling rate is typically eight to twelve times the PRN code chipping rate. Oversampling reduces the receiver sensitivity to A/D quantization noise, thereby reducing the number of bits required in the A/D converter 206. The samples produced by the downconverter-A/D conversion block 206 are forwarded for further processing by the Digital Signal Processing (DSP) block 208.

The DSP block 208 contains N parallel channels to simultaneously track the carrier frequencies and codes from up to N satellites. In general, the value of N ranges from 5 to 12, although more or less channels can be accommodated. Each channel contains code and carrier tracking loops that perform code and carrier-phase measurements as well as navigation message data demodulation. The channel may compute three different satellite-to-receiver measurement types: pseudoranges, delta ranges (occasionally referred to as "delta pseudorange"), and integrated Doppler, depending upon the precise implementation of the receiver 200. The desired measurements and demodulated navigation message data are forwarded to a navigation/receiver processor 210. The receiver processor 210 controls and commands the receiver through its operational sequence. In one embodiment of the receiver 200, the receiver processor 210 controls the receiver through channel signal acquisition, followed by signal tracking and data collection.

In one embodiment, the GPS receiver 200 uses a set of correlators to demodulate the GPS signals. In another embodiment, the GPS receiver 200 uses a set of matched filters to demodulate the GPS signals. In these other embodiments, the digital signal processor of 208 contains either correlators or matched filters.

As shown in FIG. 2, in one embodiment the receiver 200 includes a control display and input/output device 212. The input/output device 212 provides an interface between the receiver 200 and a user. The display and input/output device 212 permits operator data entry, displays status and navigation solution parameters, and typically permits access to a number of navigation functions. In one embodiment, the control display 212 provides position information that is calculated by the receiver processor 210 from the input GPS signals. In one embodiment, the input/output device 212 may be coupled to an external input/output device, such as a modem, or similar communication transceiver, for the transmission of the processed data to a remote processor, such as a base station. The base station processor may then be used to calculate or improve the accuracy of calculations of the position of the GPS receiver.

In the embodiment of the receiver 200 shown in FIG. 2, the receiver 200 also includes a frequency synthesizer 214 and local reference oscillator 216. The frequency synthesizer provides the appropriate clocking signals to the RF/IF downconverter and A/D conversion block 206 and the DSP block 208. In one embodiment, the receiver processor 210 computes tuning errors and communicates tuning corrections to the frequency synthesizer 214. Alternatively, the tuning corrections are performed during the processing operations of the digital signal processor 208.

As shown in FIG. 2, in one embodiment, the receiver 200 also includes a power supply 218 and battery-powered date/time clock 220. The power supply 218 can be integral, external, or a combination of the two. Typically, alkaline or lithium batteries are used for integral or self-contained implementations, such as handheld portable units. Existing power supplies may be used in applications wherein the receiver 200 is integrated with other applications such as GPS receivers installed in personal computers or cell phones. The battery-powered date/time clock 220 maintains data stored in volatile random access memory (RAM) integrated circuits. The battery-powered date/time clock 220 also operates a built-in timepiece (i.e., a date/time clock) as a backup in the event platform power is disconnected.

Although various embodiments are described with regard to the GPS receiver 200 shown in FIG. 2, it will be obvious to those of ordinary skill in the GPS art that several alternative GPS receiver configurations exist which may take advantage of the GPS signal cross-correlation mitigation methods described herein. For example, as noted above, the GPS receiver 200 may be embodied within a combination communication/GPS receiver unit that permits GPS data that is received by the GPS receiver to be transmitted over a communication link to a base station. The base station may then be used to perform the location calculation and transmit data back to the combination communication/GPS receiver. Such a receiver may be implemented in a hand-held, portable unit, such as a combined GPS receiver and cellular telephone.

To additionally illustrate the GPS signal cross-correlation mitigation method and apparatus herein, a description of the GPS signal format and the nature of cross-correlation spurs in general (generated when an interfering SV transmits at certain frequencies relative to a search frequency of a target SV) is provided below. An excellent description of GPS signals and the general approach of predicting cross-correlation locations is provided in U.S. Pat. No. 6,236,354, a portion of which is reproduced below, with some modification.

GPS Signal Format

In standard GPS systems, each GPS signal may be modeled in the form:

$$G_k(t)=A_k m_k(t-d)P_k(t-d,R_k)\exp(j2\pi f_k t+j\phi_k), \quad (1)$$

where $A_k$ is the signal amplitude, $P_k$ is a 1.023 Mchip/second pseudorandom code of length 1023, $m_k$ is 50 baud satellite data, $f_k$ is the carrier frequency (nominally 1575.42 MHz), $\phi_k$ is carrier phase, d is a delay that may be interpreted as a time of arrival, $R_k$ is a slight frequency offset of the chip rate due to Doppler effects, and k indicates reception from satellite number k. The quantities $P_k$ and $m_k$ assume values ±1 and transition at their respective data rates. The codes $P_k$, for different values of the variable k, are selected from among a class of Gold codes that have low crosstalk characteristics.

Although transmitted at precisely the same frequency (due to the use of onboard satellite cesium stabilized oscillators), the carrier frequencies $f_k$ may differ from one another by several kHz as seen by a receiver. This difference in received frequency is due to the different Doppler shifts observed on the ground. The Doppler shifts also cause the PN codes to have slightly different chip rates. This fact is indicated by the parameter $R_k$. In certain circumstances, the Doppler time shifts can be as large as ±2700 nanoseconds/second, so that over a one second interval, one PN code may drift by as much as ±2.7 chips relative to a second PN code.

Correlation Processing

As described in the incorporated '354 patent and in the incorporated Kaplan text, in general, GPS receivers attempt to find the time of arrival of the high speed PN signals $P_k$, and in many cases also demodulate the data messages $m_k$. In order to accomplish this they utilize local signal sources that reproduce the PN streams (so-called "references") and they compare these streams of data against a received signal, through a correlation process. For example, assume that the carrier frequency $f_k$ of equation (1) is known (or estimated correctly); then $f_k$ of equation (1) could be set to zero. In the absence of noise, if $G_k$ is multiplied by a local reference $P_k(t-s,0)$ (assuming $R_k$ is small), the result is equation (2) below:

$$A_k m_k(t-d)P_k(t-d,R_k)P_k(t-s,0)\exp(j\phi_k). \quad (2)$$

If this equation is integrated over a period of several PN frames such that $m_k$ is unchanged, the result is:

$$A_k m_k \exp(j\phi_k) \cdot \int_0^T P_k(t-d, R_k)P_k(t-s, 0)dt \quad (3)$$

When s=d, the reference is aligned with the received signal, and the quantity within the integral is a constant of unity; otherwise it varies in a pseudorandom manner about ±1. In the case where $T=NT_c$ (where $T_c$ is the chip duration) then, when the codes are aligned, the output of the above equation is:

$$A_k m_k \exp(j\phi_k)NT_c. \quad (4)$$

When the codes are not aligned, the output is typically very small. In fact, for the particular set of PN codes used, when the codes are not aligned, they assume one of three values: 1/1023 times the peak value (when aligned) and ±64/1023 times this value. Thus, an acquisition system can determine the time-of-arrival of the signal by performing the operation of equation (3) for different hypothesized delays, s. The value of delay, s, which yields a large output, is the time-of-arrival of the signal (i.e., s=d in the above case). The process of examining equation (3) for different delays, s, may be performed serially (in devices referred to in the art as "correlators"), in parallel by various fast convolution methods, or in matched filtering systems.

Figure 3:
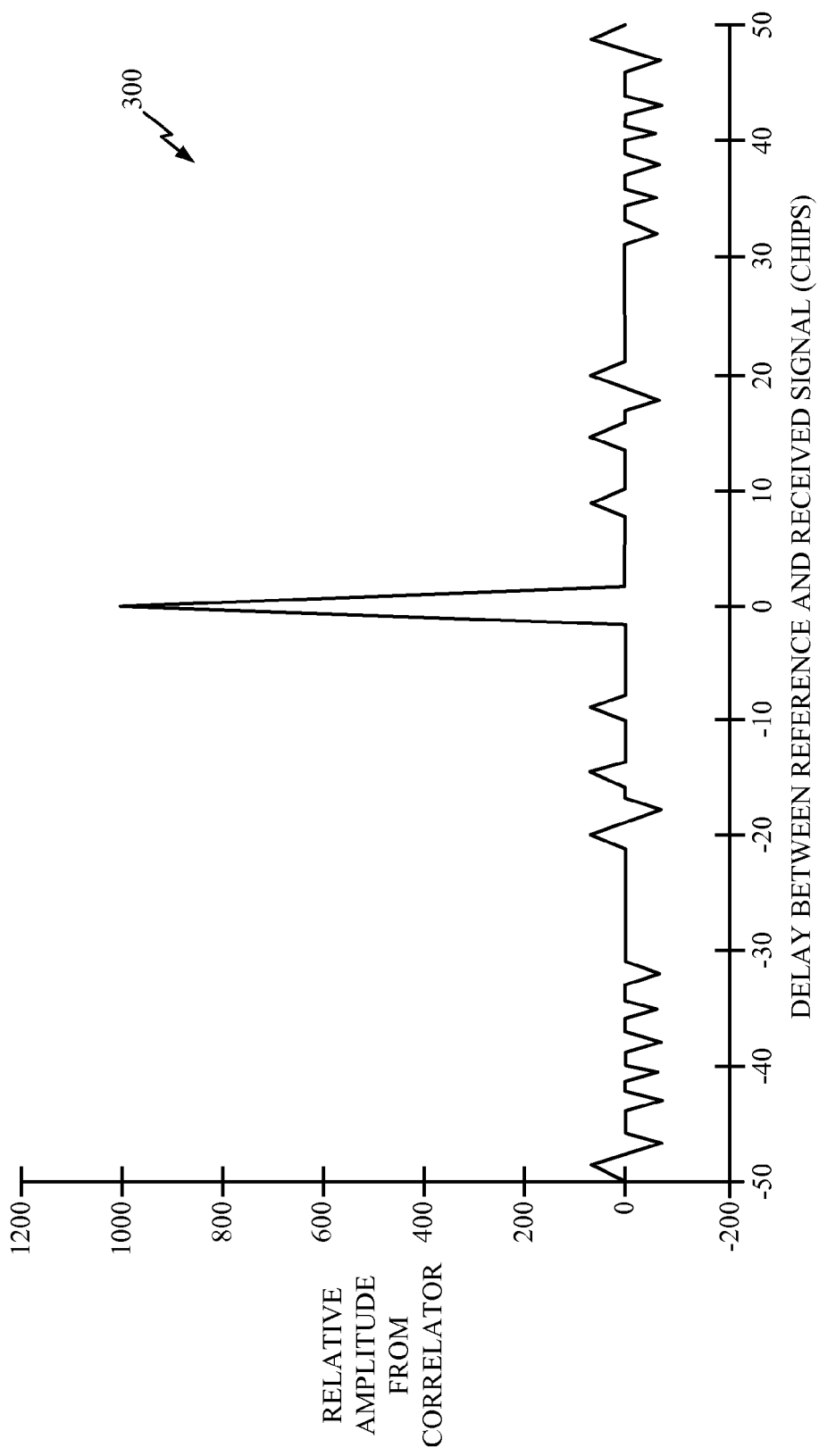
FIG. 3 is a waveform diagram illustrating the relative amplitude of an output signal of a correlator in relation to the delay between the reference and the received signal in the absence of noise.

FIG. 3 is a waveform diagram that illustrates a portion of the plot of the relative amplitude of an output signal of a correlator in relation to the delay between the reference and the received signal (i.e., d–s), in the absence of noise or any other interference. In traditional GPS receivers, each point of the curve shown in FIG. 3 is sequentially evaluated by a correlator. Alternatively, all points of this curve may be evaluated in parallel using a large series of correlators, a matched filter, or efficient fast convolution processing.

Interference Effects

The above analysis examines the cases where the reference and received signal use the same PN. In general, however, the received signal contains random noise in addition to other GPS signals having different codes and carrier frequencies. If one of the received codes has an index q, then the product of this signal and the reference corresponding to code k becomes:

$$A_q m_k m_q \exp(j\phi_k) \cdot \int_0^T P_q(t-d, R_q)\exp(j2\pi\delta f_q t)P_k(t-s, 0)dt \quad (5)$$

For equation (5), it is again assumed that the data $m_q$ does not transition over the integration period T. Also included is a residual carrier error $\delta f_q$ in equation (5).

As described in the incorporated '354 patent, the quantity in the integral of equation (5) is very small compared to unity, because the codes $P_q$ and $P_k$ are selected to have low interference properties. Nevertheless, if the interfering signal amplitude $A_q$ is large compared to $A_k$ (see equation (3) above), at some delay, s, the output of equation (5) may exceed that of equation (3). Equation (5) represents the undesired crosstalk or cross-correlation, which is referred to herein as "cross-correlation spurs." The maximum amplitude of equation (5) is affected by the residual carrier of $\delta f_q$. As contrasted with the case of the desired signal, wherein $\delta f_q=0$ produces the highest output, it is normally not the case that this offset produces the highest output for q≠k. The cross-correlation spurs of equation (4) can then mask or appear to be valid signals for situations in which the desired signal is blocked, i.e., under conditions in which $A_q$ is large compared to $A_k$. It is thus desirable to both detect the presence of such spurs, and reduce their influence upon the acquisition and processing of the desired signal.

Frequency Offset Effects

There is a subtle yet important effect concerning the frequency offset $\delta f_q$ between the reference and the interfering GPS signal of equation (4) that depends upon the integration time of (4) (also referred to herein as the "coherent integration time"). If the coherent integration time is selected such that the integration time is equal F * PN frames, wherein "F" is an integer, then the cross-correlation spurs are only significant when the frequency difference is in the vicinity of 0, ±1 kHz, ±2 kHz, ±3 kHz (i.e., at multiples of 1 kHz). Furthermore, the size of the vicinity is inversely proportional to F. That is, if F is equal to 10 PN frames, for example, this region is less than about ±80 Hz. If F is equal to 5 PN frames, this region is ±160 Hz. This then becomes a mechanism for determining if cross-correlation spurs are a potential problem.

The inventor of the '354 patent stated that it is normally not profitable to integrate coherently beyond 20 PN frames, because at this point the embedded data $m_k$ is guaranteed to have a transition. Further, the inventor indicated that it would not improve the amplitude of the output of the integral of equation (2) above to integrate over periods that exceed about one data symbol (because the data randomly flips the sign of the integrand). However, as described below in more detail, the method and apparatus described herein takes advantage of the fact that searches can be performed using coherent integration lengths of longer than 20 ms. As described below in more detail, in some described embodiments, the various embodiments described herein are intended for use in a wireless communication system having a position determination entity (PDE) that assists the GPS receiver in locating satellite signals. In some embodiments, the PDE provides information to the GPS receiver regarding the time of transmission and the contents of the data bits that are transmitted to the receiver from the SVs. The method and apparatus described herein takes advantage of this additional information by integrating over a period that has duration longer than 1 bit. This enables the GPS receiver to search for weaker signals than were possible with the prior art receivers.

If the effects of Doppler on the chip rate are ignored in equation (5), an integration time of F frames yields the following relationship (Equation 6):

$$A_q m_k m_q \tag{6}$$

$$\exp(j\phi_k) \cdot \sum_{u=0}^{F-1} \int_0^{T_f} P_q(t-d, R_q)\exp(j2\pi\delta f_q(t-uT_f))P_k(t-s, 0)dt$$

wherein $P_q$ and $P_k$ are periodic with frame period $T_f$, that is, $P_q(t-d-u, Rq)=P_q(t-d, R_q)$ and $P_k(t-s-u, 0)=P_k(t-s, 0)$. This then reduces to the following equation (Equation 7):

$$A_q m_k m_q \exp(j\phi_k) \cdot \sum_{u=0}^{F-1} \exp(-j2\pi\delta f_q u T_f) \tag{7}$$

$$\int_0^{T_f} P_q(t-d, R_q)\exp(j2\pi\delta f_q t)P_k(t-s, 0)dt =$$

$$A_q m_k m_q \exp(j\phi_k - j\pi T_f(1+F)) \frac{\sin(\pi\delta f_q F T_f)}{\sin(\pi\delta f_q T_f)}$$

$$\int_0^{T_f} P_q(t-d, R_q)\exp(j2\pi\delta f_q t)P_k(t-s, 0)dt$$

In equation (7), the term $$\frac{\sin(\pi\delta f_q F T_f)}{\sin(\pi\delta f_q T_f)}$$

represents the variation of the cross-correlation spur strength versus offset frequency (i.e., the frequency between the reference and the undesired code frequency). If this offset is set equal to zero, then this gain is simply F. This means that F frames of data are being added together with no loss. Hence, a normalized gain is simply as follows (Equation 8):

$$H(F, \delta f) = \frac{\sin(\pi\delta f_q F T_f)}{F\sin(\pi\delta f_q T_f)} \tag{8}$$

This function is very close to the well known function sinc ($\delta f_q F T_f$) wherein sinc(x)=sin($\pi$x)/($\pi$x), especially when F is large.

Figure 4:
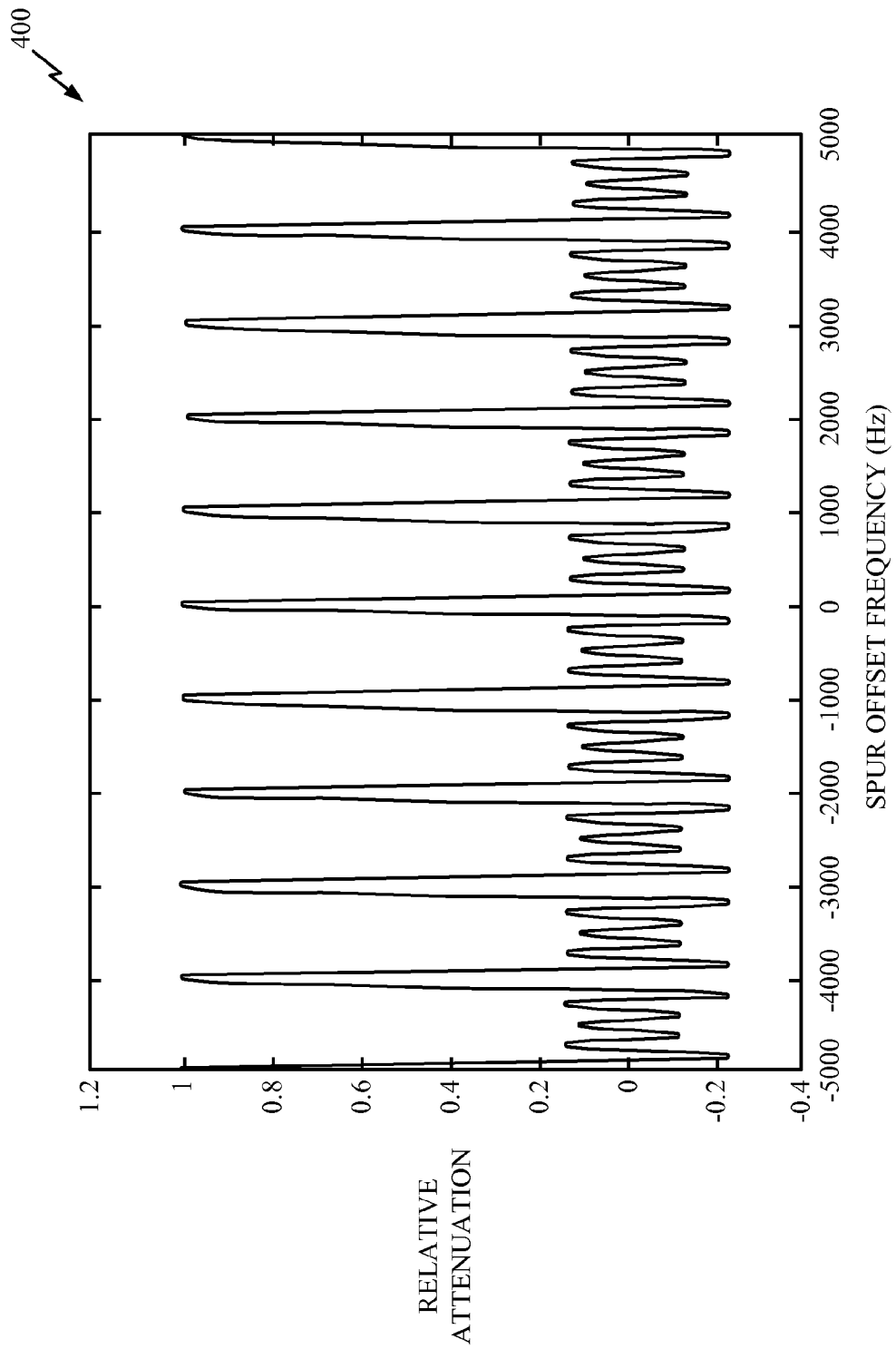
FIG. 4 shows a waveform diagram illustrating the shape versus frequency offset for a received satellite signal at a particular frequency.

FIG. 4 shows a waveform diagram that illustrates the shape versus frequency offset for F=9. As can be seen in waveform 400, there is a "mainlobe" about the frequencies 0, ±1 kHz, ±2 kHz, (i.e., at multiples of 1 kHz). Outside these mainlobes the maximum absolute value is approximately −0.2265 (−13 dB). This attenuation, plus that provided by the near orthogonality of the PN codes, combines for an effective attenuation of almost 40 dB relative to the correlation of a PN code against a matched code. This attenuation effectively eliminates the cross-correlation spur from being significant. That is, at this level, thermal noise effects will normally significantly exceed the cross-correlation spurs at the output of the correlator.

Figure 5:
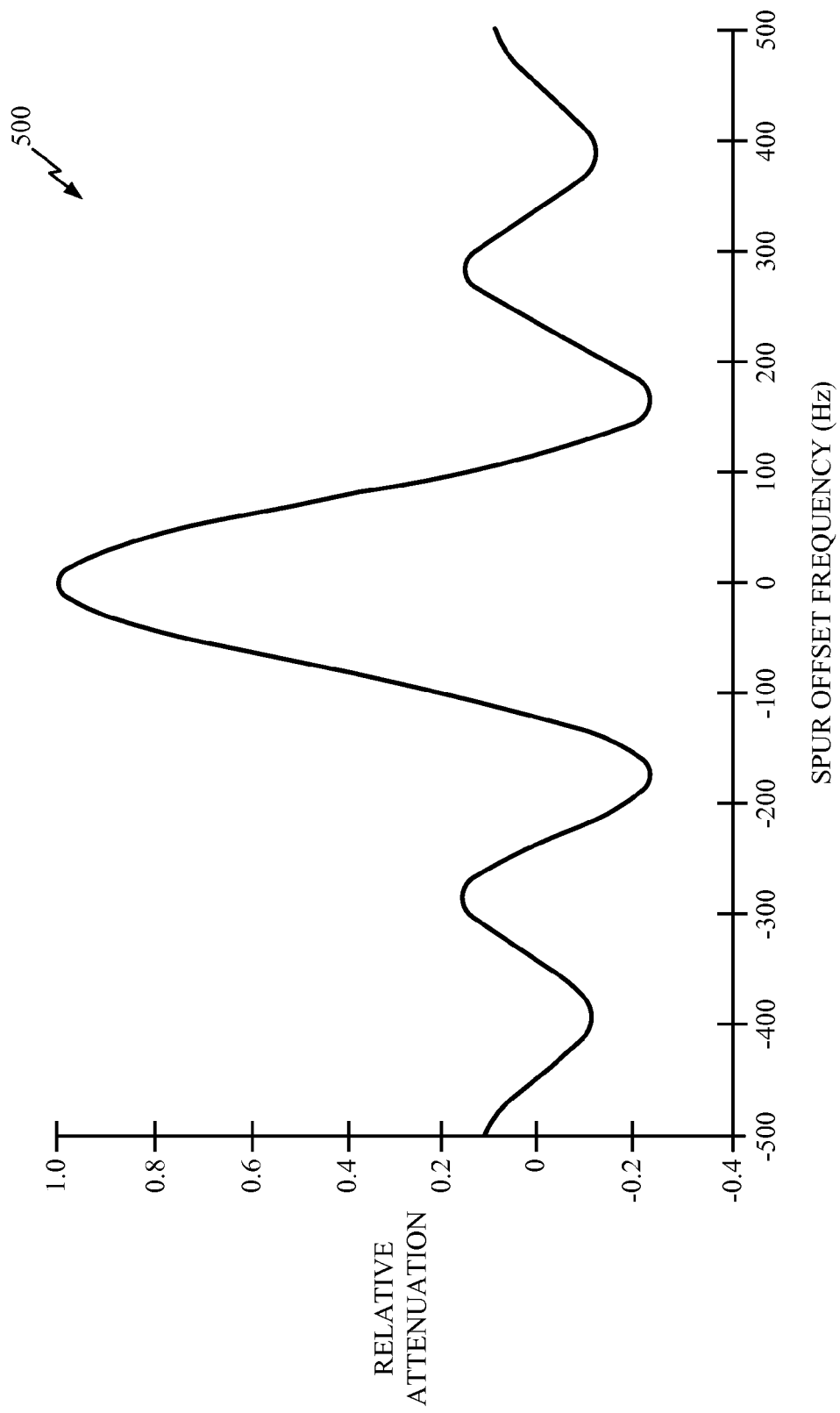
FIG. 5 is a detailed waveform diagram of the central portion of the waveform of FIG. 4.

FIG. 5 shows a more detailed waveform diagram of the central portion of waveform 400 of FIG. 4. In waveform 500 of FIG. 5, it can be seen that at offset frequency ±80 Hz, the attenuation is approximately 0.332 (approximately 9.6 dB), which is also sufficient to eliminate, or at least minimize, the effects of the cross-correlation spur for most practical purposes.

Typical Cross-Correlations for Spurious Signals

When the spur offset frequency is a multiple of 1 kHz, there is no attenuation due to the frequency offset and the maximum cross-correlation spur level may be calculated from the latter integral of equation (7) alone. The magnitude of this quantity is a function of the two GPS codes of interest (the desired signal and the interfering signal), and the frequency offset. For most purposes this offset need only be known to the nearest 1 kHz to determine the cross-correlation spur level. The location in time of the spur will be a function of the time-of-arrival of the interfering signal relative to the timing of the local reference.

Figure 6A:
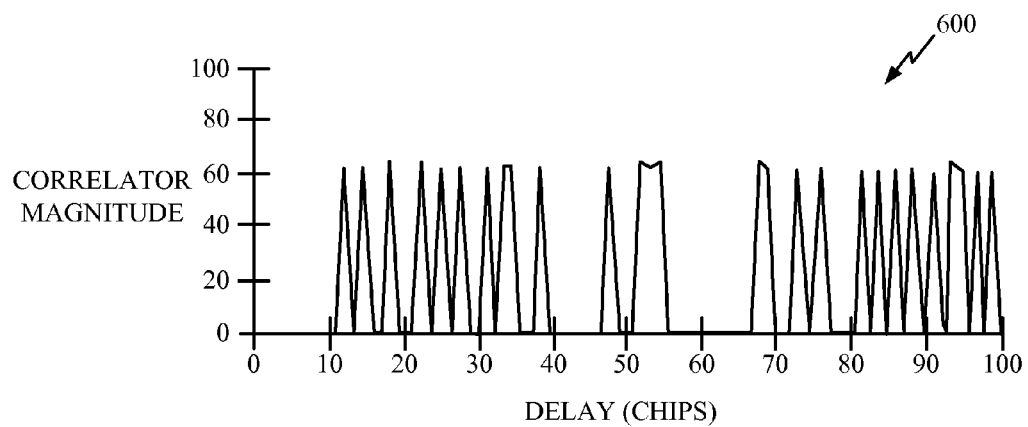
FIG. 6a is a waveform diagram of a received GPS signal with no frequency offset.
Figure 6B:
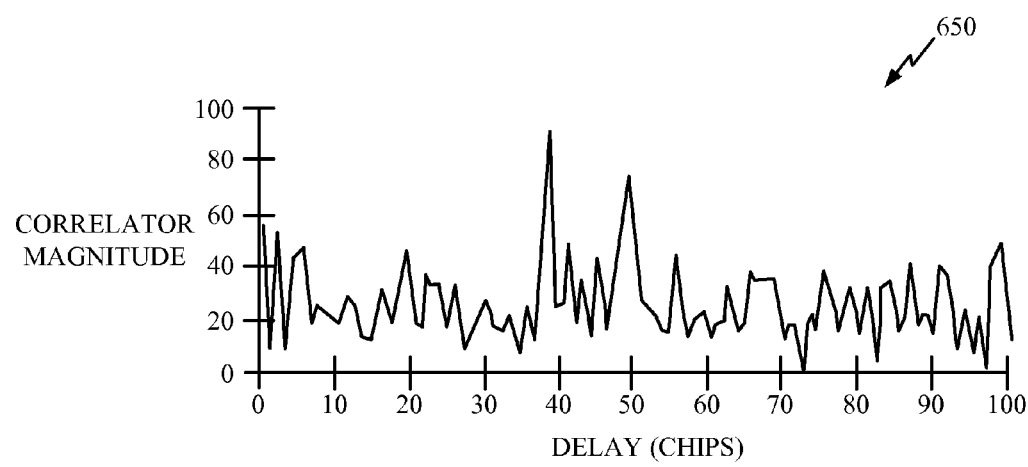
FIG. 6b is a waveform diagram of a received GPS signal at a first frequency offset.
Figure 7A:
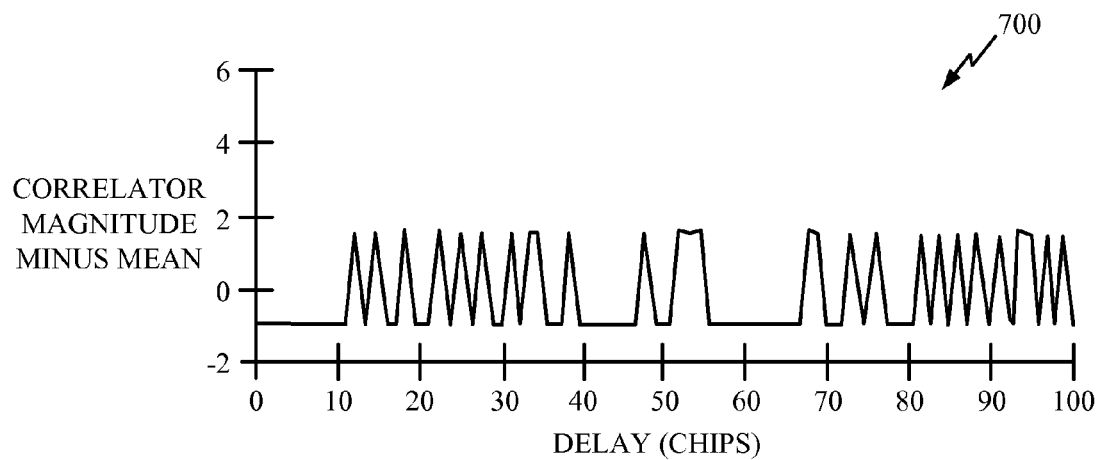
FIG. 7a is a waveform diagram of the waveform of FIG. 6a after a mean subtraction and normalization operation.

Evaluating the latter integral of equation (7) for any two GPS signals and offset frequencies is a relatively simple matter. FIGS. 6A and 6B are two waveform diagrams of this integral for GPS satellite vehicles 1 and 2 with a 0 Hz offset and a 2000 Hz offset, respectively. The spiky behavior of the waveform 650 of FIG. 6B provides difficulties. As described in the incorporated '354 patent, the waveforms of FIG. 6B typically are processed by first subtracting the means. If the means are subtracted for each of the plots and normalized by the resulting standard deviations, waveforms such as waveform 700 or 750 of FIGS. 7A and 7B result. Note that waveform 750 of FIG. 7B, i.e., with a 2000 Hz offset, shows some very strong spikes. These spikes can be misinterpreted as true satellite signals and, in addition, may obscure the actual true signals.

Comparing FIG. 3 to FIGS. 7A and 7B, it can be observed that the peaks of the spurs are much lower then those of true satellite signals, if all of the GPS signals have the same received power. However, because the interfering GPS signal may be much stronger than the satellite signal matched to the reference, these cross-correlation spurs may still be detectable, and may in fact be stronger than the desired signals. Furthermore, these spurs may persist for many minutes. Examining the waveform 750 of FIG. 7B, it can be observed that the cross-correlation of two satellite signals with a given frequency offset produces a specific waveform or "signature."

Figure 7B:
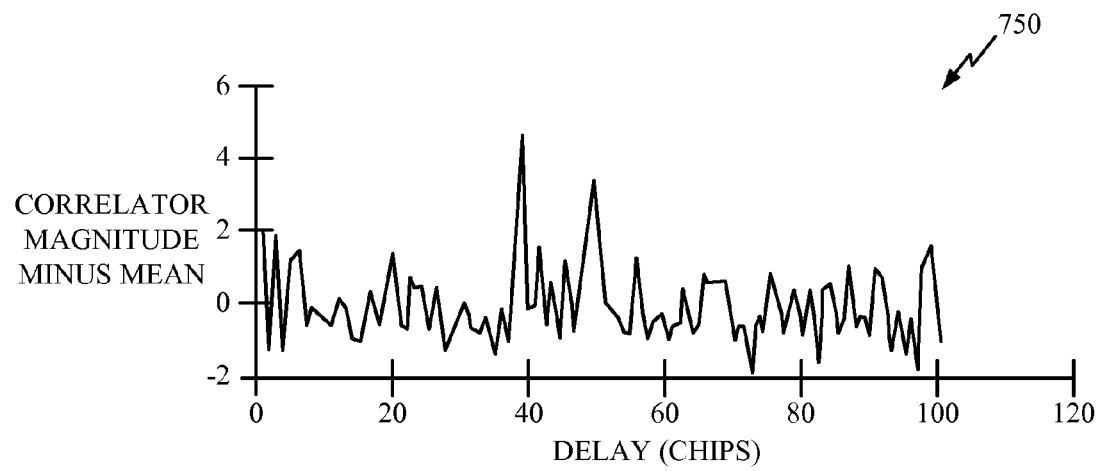
FIG. 7b is a waveform diagram of the waveform of FIG. 6b after a mean subtraction and normalization operation.

Only the first 100 chips of this signature are shown in FIG. 7B. As described in the incorporated '354 patent, the locations of the strong spikes of this signature can be used to mitigate interference between strong and weak received satellite signals. These cross-correlation functions may be stored or computed for all pairs of GPS PN codes and frequency offsets, and used to identify and ameliorate interference conditions. For example, when the frequency offsets between strong and weak signals are problematic (e.g., the differences in frequency are close to multiples of 1 kHz), then the positions of the spikes of waveforms like those of FIG. 6B can be used as time offsets, or "pseudoranges" to be ignored, when acquiring or tracking the weak signals. This approach eliminates false alarms and lock conditions at the expense of occasional loss in detection of valid signals.

Note that the strong spikes of waveform 750 of FIG. 7B are observable only when the strong interfering satellite signal is very strong (e.g., when received from an overhead satellite with little blockage). Otherwise, the spurious signals of this waveform 750 tend to be masked by the effects of background thermal noise. Hence, measured amplitude, or the signal-to-noise ratio (SNR), of the potential interfering signal can be an important factor in ascertaining whether the signal may, in fact, produce significant interference.

As described in the incorporated '354 patent, one prior art approach to reducing interference of strong satellite signals is referred to as a "post-detection subtraction" approach. According to this approach, a stored or computed waveform, such as those of waveforms 650 or 750 (FIGS. 6B and 7B, respectively), are used as an interference waveform that is subtracted from the correlation output signal. In order to perform a precise subtraction, the amplitude and delay of the waveform, such as 650, is first ascertained. For purposes of this description, reference is made to FIG. 1 in which the satellite 104 produces a strong satellite signal $Y_S$ and the satellite 108 produces a weak satellite signal $Y_W$. The PN codes associated with these satellites 104 and 108 are $P_S$ and $P_W$, respectively. When $P_W$ is used as the reference signal, a distortion term results due to the interference caused by the strong satellite 104. This distortion is illustrated by the waveform 650 (FIG. 6B) (and waveform 750 (FIG. 7B) with the mean removed) appropriately scaled in amplitude and delayed by an amount equal to that associated with the delay of the signal received from the satellite 104. The amplitude and delay may be previously determined via a correlation procedure when searching for $P_S$. The amplitude and delay can then be used to scale and delay the waveform 650 (FIG. 6B). The result is then subtracted from the correlation of the input data with satellite 108. This approach is referred to as a post-detection subtraction approach because the estimated interference waveform is subtracted from a detected correlation waveform.

In some benign signal environments, such as those that feature little motion of the receiver and little multipath interference, a "pre-detection subtraction" approach can be used to remove unwanted signal interference. In accordance with this approach, the amplitude, delay, and phase of the strong satellite signal, $P_S$ are estimated and used to reduce the cross-correlation effects. As described in the incorporated '354 patent, the estimated signal parameter data is used to construct an estimate of the strong satellite signal. The estimated waveform is then subtracted from the composite received GPS signal prior to any signal processing. When an accurate waveform can be estimated, superior performance over the post-detection subtraction approach is possible. However, the pre-detection subtraction approach may not be practical in many situations, because it requires accurate estimation of the satellite signal carrier phase. During initial signal acquisition, such an estimate may not be available, especially if the received signal is weak, although it may be more readily available during tracking.

Peak Widening

In the description given above, the time related effects resulting from frequency offsets between the reference and the interfering signals are ignored. However, if, for example, the interfering signal has a carrier frequency that differs by 4000 Hz from that of a local reference signal, a strong cross-correlation spur can be produced. A carrier error of 4000 Hz, however, translates to an error in chip rate by 4000 * 1.023 MHz/1575.42 MHz=2.66 Hz. Thus, if a correlator processes data for a period of time of one second, the interfering signal will effectively slide past the reference by approximately 2.66 chips. This has the effect of widening the peak widths of waveforms such as the waveforms 700 and 750 of FIGS. 7A and 7B, respectively.

As noted in the '354 patent, if a correlation is performed coherently over a period of nine PN frames, this by itself often does not always produce a sufficiently strong signal for detection purposes, when considering additive noise. To further improve signal strength, the output of the correlation process can be passed through a magnitude or magnitude-squared operation and stored. The process can then be repeated for the next nine PN frames and the results added to the prior result. This can continue for many groups of nine PN frames. For example, if this process is repeated 111 times, approximately one second of data is processed. This procedure produces one point on the output waveform 750 of FIG. 7B, for example. Multiple correlators, or parallel matched filter processing, can allow all the points of FIG. 7B to be produced in this manner. The resulting waveform exhibits a spreading of the peaks in accordance with the scaled frequency offset between the reference and the cross-correlation spur. This spreading can again be used as a signature to indicate potential spurious situations.

False Alarm Reduction Via Threshold Adjustment

As can be seen in waveform 750 of FIG. 7B, the cross-correlation waveform is unusually spiky and the positive going spikes tend to be much greater than the negative going ones. This is in great contrast to the situation when cross-correlation spurious energy is low in amplitude and the waveform is dominated by thermal noise. A typical noise level estimate procedure would compute the root-mean-squared (RMS) value of the waveform 750. That is, $\sigma_1 = [\text{mean}(s(n)^2)]^{1/2}$, wherein n is the indices over which the mean is taken. A detection threshold is then set to $k\sigma_1$, where k is a number typically on the order of 5, and is selected to yield a given false alarm probability.

Cross-Correlation Mitigation in a GPS Receiver in a Wireless Communication System—"MS-Assisted" and "MS-Based" Modes of Operation As noted above, the cross-correlation mitigation method and apparatus herein are intended for use in a wireless communications system. In some embodiments, the wireless communication system includes a Position Determination Entity (PDE) that assists the GPS receiver (also referred to herein as the Mobile Station (MS)) in searching for and locating satellite signals transmitted by the SVs. In these embodiments, referred to herein as the MS-Assisted approach, the PDE provides information to the GPS receiver regarding the satellite transmit frequencies, times to expect receipt of the satellite signals, and the data bits transmitted to the receiver. In the MS-Assisted mode of operation, using the information provided by the PDE, the inventive method and apparatus can integrate over a period exceeding one bit. This, in turn, allows the MS-Assisted inventive method to search for and detect weaker signals than were heretofore possible using the prior art approaches. Cross-correlations pose increased risks in the MS-Based Mode of Operation. As described in more detail below, cross-correlations pose increased risks in the MS-Based operational modes because the received signal peaks are used to re-center and narrow the search windows used to identify subsequent SVs. Cross-correlation spurs can therefore cause the receiver (MS) to never detect the remaining SVs. Both the MS-Assisted and MS-Based cross-correlation mitigation methods and apparatus are described below in more detail. The MS-Assisted (i.e., wherein the MS uses information provided by the PDE) cross-correlation mitigation method and apparatus is described first, followed by a description of the MS-Based approach.

The cross-interference reduction method disclosed in the incorporated '354 patent and described above is a relatively sophisticated technique and therefore has a relatively complex implementation. In accordance with the technique disclosed in the '354 patent, spurious signals occurring when processing a weak received satellite signal due to interference by a stronger received signal are reduced by estimating certain characteristics of the stronger signal, creating an interference waveform based on these estimated characteristics, and subtracting the interference waveform from a set of correlation outputs for the weaker signal to remove the interference effects of the stronger signal. Although the technique described in the '354 patent is very useful when the receiver must demodulate received signals, implementation is complex and comes at a processing and power cost. Such complex implementation may be unnecessary in applications where the receiver only needs to locate and identify received satellite signals. The cross-correlation mitigation technique described herein is intended for use in GPS receivers wherein the receivers need only locate GPS satellite signals, and not demodulate the received signals. In some applications, therefore, this technique may be less complex and easier to implement than the technique disclosed in the '354 patent.

In very simple terms, the satellite signal searching technique used with the cross-correlation mitigation method and apparatus herein identifies strong received satellite signals and discards weaker received satellite signals. If both strong and weak signals are received, and it appears that the strong signal produces the majority of the energy in the weaker signal, the weaker signal is discarded. Two embodiments of a GPS satellite signal search mode architecture intended for use with the present cross-correlation mitigation method and apparatus is now described with reference to FIGS. 8a and 8b.

GPS Search Mode Architecture

In one embodiment, GPS satellite signals are searched in accordance with a GPS Search Mode Architecture. The GPS search mode architecture is implemented in software and is resident in an integrated circuit (IC) within the GPS receiver. However, those skilled in the GPS communications and software design arts shall recognize that other embodiments of the GPS search mode architecture are possible and that the described embodiments should not be interpreted as limiting the scope or spirit of the present invention. In one embodiment, the GPS Search Mode Architecture includes different levels of search modes, each having different coherent integration lengths and varying degrees of sensitivity. For example, FIG. 8a is a simplified high level state machine 800 of a first embodiment of the GPS search mode architecture adapted for use with the present invention. FIG. 8a shows the high level state machine of the search procedures to be followed when searching for SV satellite signals.

In accordance with the embodiment shown in FIG. 8a, relatively fast ("High Mode") searches are first performed in order to detect strong satellite signals. Longer (i.e., "deeper") search modes can subsequently be used to detect weaker satellite signals. For example, a "Low Mode" is the deepest, or longest search mode of the three search modes. Once the satellite signals are detected, cross-correlations are detected and filtered before the search results are reported.

Referring now to FIG. 8a, the search architecture includes three levels of searching, or three search modes, referred to herein as "High" (802), "Medium" (804), and "Low" (806) search modes. In this embodiment, as shown in FIG. 8a, a "High" Mode search (state 802) is first performed for all of the SV signals. The High Mode search is immediately followed by a "Medium" Mode (state 804) or a "Low" Mode search (state 806). These "deeper" searches (i.e., the "Medium" or "Low" Mode searches) are performed for satellite signals that are not detected in state 802 by the High Mode search. In one embodiment, the deeper searches are also performed for satellite signals that are detected during the High Mode search, yet are sufficiently weak to be successfully detected by the deep mode searches (provided that saturation does not occur in the deeper search modes). The combined search results (either a combination of the High Mode (state 802) with the Medium Mode (state 804) search results, or a combination of the High Mode with the Low Mode (state 806) search results) are then passed to a Filter and Report state 808.

Before the search results are reported, they are first filtered using one or more of the present cross-correlation mitigation methods described in detail hereinbelow. After removing any detected cross-correlations, the search results are reported at state 808. In one embodiment, for example, in MS-Assisted embodiments, the filtered search results are reported to a Position Determination Entity (PDE) in a wireless communication system. However, those skilled in the communications art shall recognize that the filtered search reports can be provided to any convenient processing means.

Table 3 below shows the search parameters that may be used in the first embodiment of the GPS search mode architecture. Those skilled in the GPS design arts shall recognize that the search parameters shown are given as examples only. As shown in Table 3, the search modes have different search lengths (i.e., different coherent, non-coherent, and total integration times) and consequently different sensitivities. For example, in the embodiment shown in Table 3, the coherent integration time for a "High" Mode search is 20 ms and the total integration time is 80 ms. In contrast, the coherent integration time for the deeper "Low" Mode search is 80 ms and the total integration time is 1280 ms. The minimum carrier to noise power (expressed as a ratio in dB-Hz), "C/No", detection threshold value for a High Mode search is 25.5 dB-Hz. In contrast, owing to the longer integration times used when performing a Low Mode search, a lower C/No detection threshold (of 14.1) can be used to detect SV signals when performing a Low Mode search. As described in more detail below, because the different search modes use differing integration lengths, the detection thresholds used to mitigate against cross-correlations are varied accordingly during the filtering step 808 (FIG. 8a).

TABLE 3

GPS Search Mode Parameters (First Embodiment)

| Search Mode | Freq Search Space (Hz)[1] | Num Freq Bins | Num Code Bins (cx2) | Coherent[2] Integ Time (ms) | Non-Coherent Integ | Total Integ Time (ms) | Min C/No (dB-Hz) | Max C/No (dB-Hz) |
|---|---|---|---|---|---|---|---|---|
| High | ±250 | 20 | 64 | 20 | 4 | 80 | 25.5 | 55.0 |
| Medium | ±250 | 20 | 64 | 20 | 16 | 320 | 20.9 | 46.3 |
| Low | ±62.5 | 20 | 64 | 80 | 16 | 1280 | 14.1 | 36.3 |

[1]Up to 1 dB loss at edge of search space.
[2]Coherent integration greater than 20 ms requires the use of modulation "wipeoff."

A second embodiment of the GPS search mode architecture is now described with reference to FIG. 8b and Table 4 below. FIG. 8b shows a second embodiment of a high level state machine 800' of the search procedures to be followed when searching for SV satellite signals. Table 4 below shows the search parameters that may be used in the second embodiment of the GPS search mode architecture. The second embodiment of the GPS search mode architecture is very similar to the first embodiment with the exception that an additional search mode, referred to in FIG. 8b as a "Level 0" (or Mode 0) search mode (state 820), is included. A Mode 0 search (i.e., state 820) is invoked only when one or more of the SVs has a very large code phase search window. If none of the SVs have very large code phase search windows, state 820 is bypassed and a Level 1 (or Mode 1) search is performed. The Mode 0 search provides a coarse acquisition search capability. The Mode 0 search performs a very shallow (and therefore, very fast) search over a full PRN circle for all SVs. Based on the results of the Mode 0 search, acquisition assistance data is modified yielding a small search window that captures the strongest peak for each SV.

Filter and Report state 808 whereat cross-correlations are detected and removed before the search results are reported. As described in more detail below, the cross-correlations are detected in accordance with one or more of the cross-correlation mitigation methods described herein. As described above, in one embodiment, the filtered search results are reported to a Position Determination Entity (PDE) in a wireless communication system. If the measurements are deemed insufficient for filtering and reporting purposes, a deeper Level 2 search is performed (state 804).

With the following exception, the Level 2 (Mode 2) search, is very similar to the Medium Mode search (state 804) described above with reference to FIG. 8a. Unlike the Medium Mode search of FIG. 8a wherein the non-coherent length is fixed, the number of non-coherent operations used in the Level 2 search of FIG. 8b (state 804) is variable. For example, as shown in Table 4 above, the non-coherent length can be increased from 20 to 44 (with a corresponding increase in the total integration time from 400 ms to 880 ms, respectively). The number of non-coherent operations may be increased such that at least two searches per channel, per visit,

TABLE 4

GPS Search Mode Parameters (Second Embodiment)

| Search Mode | Freq Search Space (Hz)[1] | Num Freq Bins | Num Code Bins (cx2) | Coh Integ Time (ms)[2] | Non-Coh Integ | Total Integ Time (ms) | Detect Thresh C/No (dB-Hz)[3] | Sensitivity C/No (dB-Hz)[4] | C (dBm)[5] | Strong Meas C/No (dB-Hz)[7] |
|---|---|---|---|---|---|---|---|---|---|---|
| 0 | ±250 | 20 | 64 | 20 | 1 | 20 | — | 31.0 | −140.0 | — |
| 1 | ±250 | 20 | 64 | 20 | 4 | 80 | 25.0 | 26.4 | −144.6 | 43.7 |
| 2 | ±250 | 20 | 64 | 20 | 20 | 400 | 20.2 | 21.4 | −149.8 | 32.5 |
|   |      |    |    |    | 44 | 880 | 18.1 | 19.2 | −151.8 | 29.3 |
| 3 | ±31.25 | 20 | 64 | 160 | 5 | 800 | 15.0 | 16.3 | −154.6 | 26.2 |
|   |      |    |    |    | 11 | 1760 | 13.0 | 14.3 | −156.7 | 22.9 |

[1]Up to 1 dB loss at edge of search space.
[2]Coherent integration greater than 20 ms requires the use of modulation "wipeoff".
[3]Based on false alarm probability of $10^{-5}$, assuming 32 chip search windows.
[4]Sensitivity is defined as the operating point at which a $P_{MISS} = 50\%$ and $P_{FA} = 10^{-5}$. Peaks are uniformly distributed in code phase and Doppler excluding the outermost two edge frequency bins.
[5]Assumes a 3 dB noise figure (i.e., C = Sensitivity C/No − 174 + 3).
[6]The two rows for modes 2 and 3 represent two selectable amounts of total integration.
[7]A measurement is "strong" if its RMSE is below 3, 5 or 7 meters for modes 1, 2 and 3, respectively.

In one embodiment, the only mode having an 80 ms coherent integration time uses a total integration time of 1760 ms. In some applications, total integration times may exceed 1760 ms. In addition, in some embodiments, the total integration times may be adaptively selected.

The Level 1 (Mode 1) search (state 802) is analogous to the "High Mode" search described above with reference to FIG. 8a. If sufficient measurements are available after the Level 1 search is performed, the search procedure 800' proceeds to the may be performed. This search may take one or more visits to the selected GPS frequency. Similar to the Level 1 search described above, if sufficient measurements are available after the Level 2 search is performed, the search procedure 800' proceeds to the Filter and Report state 808 for further processing. Otherwise, the deepest search, a Level 3 (Mode 3) search is performed at state 806.

With exception of the following described modification, the Level 3 (Mode 3) search (state 806) is very similar to the Low Mode search (state 806) described above with reference to FIG. 8a. The coherent and non-coherent integration lengths used in performing a Level 3 search permit at least one search per channel per visit to be performed. As shown in Table 4, the coherent integration length is increased from 80 ms to 160 ms. The non-coherent lengths are increased to 5 or 11. The smaller non-coherent integration values can be used in order to improve voice quality. The increase in coherent integration time increases sensitivity at the expense of a reduction in frequency search space. Similar to the Mode 2 (state 804) and Mode 1 (state 802) searches described above, if the Mode 3 search yields acceptable measurements, the search procedure is terminated and proceeds to the Filter and Report state 808. If the search does not produce acceptable results, the Mode 3 search can be repeated until acceptable measurements are obtained. The number of repetitions of Mode 3 searches can be selected by a system designer in order to obtain measurements in weak and fading environments.

In accordance with the second embodiment of the GPS search mode architecture, in the Level 1 (or Mode 1) search (state 802 of FIGS. 8a, 8b), the Code Phase and Doppler windows for each SV are enlarged and segmented. The Mode 1 search segments are then processed. A "max peak" algorithm is then performed for each search result. In one embodiment, once all search segments have been processed, the measurements are segmented into three satellite signal categories: "Strong", "Weak", and "None". For example, in one embodiment, if the normalized peak energy for a given SV exceeds a predefined Level 1 threshold, then the measurement is classified as "Strong". Otherwise, the measurement is classified as "Weak" or "None" depending upon whether a detectable measurement is found.

As described above with reference to the state machines of FIGS. 8a and 8b, once all of the searches have been processed, a variety of cross-correlation tests may be performed on the detected satellite signals (for example, at the state 808) to eliminate interfering SVs from further consideration or processing. Any measurements that are identified as cross-correlations shall have their status changed from "Strong" or "Weak" (depending upon whether the received detected satellite signal is initially classified as a "Strong" or "Weak" signal according to a predefined threshold) to "None" (i.e., the measurement is discarded as a cross-correlation signal). Based on the surviving set of Strong and Weak measurements, a measurement sufficiency test can be performed to determine if an early exit from the search procedures is appropriate. If there are a sufficient number of qualified measurements (based upon predetermined criteria), the search procedure may be exited. Otherwise, a list of Doppler and C/No measurements for each surviving "Strong" and "Weak" measurements is maintained. This list can be used in subsequent search levels (e.g., in Levels 2 and 3) to inhibit the selection of cross-correlations when searching for weaker satellite signals. In subsequent search levels (e.g., at states 804 and 806 of FIGS. 8a and 8b), a search is again performed for all SVs having a "Weak" or "None" status. Thus, in this embodiment, "Strong" measurements are reported to the PDE and are not searched again.

In accordance with the second embodiment of the GPS search mode architecture, in the Level 2 (or Mode 2) search (state 804 of FIGS. 8a, 8b), the Code Phase and Doppler windows for each SV classified as "Weak" or "None" are enlarged and segmented (i.e., a search is not performed for SVs classified as having "Strong" measurements). The Mode 2 search segments are then processed in accordance with a "multi/max" peak algorithm. The algorithm searches for the maximum energy peaks. It also searches for valid earlier energy peaks caused by multi-path propagation effects. In addition, as described below in more detail, using the list of measurement data obtained in a previous search level (i.e., in the Level 1 search mode), peaks in bins identified as likely containing cross-correlations are preemptively excluded from further consideration.

After all search segments have been processed, the measurements are segmented into three categories: "Strong", "Weak", and "None". If the normalized peak energy for a given SV exceeds a predefined Level 2 threshold, then the measurement is classified as "Strong". Otherwise, the measurement is classified as "Weak" or "None" depending upon whether a detectable measurement is found.

In accordance with the second embodiment of the GPS search mode architecture shown in FIG. 8b, a request is issued to the PDE to obtain GPS sensitivity assistance between the last Level 2 and the first Level 3 GPS visit. After the GPS receiver receives the sensitivity assistance data, a Level 3 (or Mode 3) search is performed if required. The Level 3 search is analogous to the Level 2 search with the exception that the Level 3 search can be repeated any required number of times. Prior to each repetition, additional GPS sensitivity assistance data can be requested from the PDE.

As described above, regardless of which embodiment of the GPS search mode architecture is used, once all of the searches have been processed, several cross-correlation tests may be performed. These cross-correlation tests are described in more detail below. All of the cross-correlation tests described below may be performed together, or separately, to eliminate interfering satellite signals. The cross-correlation tests are optional in the sense that at worst, a cross-correlation will be misidentified as a valid SV signal. If incorrectly identified as a valid SV signal, the measurement is added to a satellite signal measurement database. If the erroneous cross-correlation measurement is added to the signal measurement database, it may be identified (and eliminated) during subsequent measurement data processing if the solution is over-determined. Otherwise, the erroneous measurement may go unidentified and produce an erroneous position determination. In applications wherein SV signals are tracked and demodulated, a misidentification of a cross-correlation as a valid signal results in wasted processing resources for the time period that the misidentified signal is tracked. Typically, this time period is relatively short.

The cross-correlation testing methods described below can be used to reduce the amount of resources wasted on the tracking of misidentified satellite signals and to improve the accuracy of the satellite signal searching methods described above. The "Mainlobe" test described below is very important in achieving desirable receiver performance. Without it, the GPS receiver performance is impaired. However, in one embodiment of the present GPS receiver, if a signal is detected (during the Level 1 (High Mode) (state 802), Level 2 (Medium Mode) (state 804), or Level 3 (Low Mode) searches of FIGS. 8a, 8b) with significant energy content, all of the below-described cross-correlation tests are performed to eliminate interfering signals from further consideration or processing. The "Mainlobe" cross-correlation test is first described. The description of the Mainlobe test is followed by a description of the "Variable C/No Mask", "Strong", "Wide Doppler", and "Pre-emptive" cross-correlation tests.

"Mainlobe" Cross-Correlation Test

As described above, cross-correlation spurs are generated when an interfering SV transmits at certain frequencies relative to the search frequency of the target SV. Because the C/A codes have a period of 1 ms, the most significant cross-correlations occur when the Doppler difference between the interfering SV signal and the target SV signal is a multiple of 1 kHz. There are also weaker cross-correlations that occur at other frequencies. When the Doppler difference between the interfering SV signal and the target SV signal is zero Hz, the cross-correlation power adopts one of three specific values, relative to the power of the stronger SV (assuming that chip boundaries are synchronized for the two SVs). These values are shown in Table 1 above. When the Doppler difference is nonzero and a multiple of 1 kHz, the worst-case cross-correlation power is −21.1 dB (relative to the interfering SV). Table 2 above displays the cross-correlation distribution for Doppler differences of 1, 2, 3, 4 and 5 kHz.

In accordance with one embodiment, cross-correlations are identified by comparing C/No measurements of all SVs in a pairwise fashion as shown in FIG. 9. In accordance with this embodiment, Doppler difference (for the Doppler differences between the target and interfering SV signals) and C/No thresholds are selected to identify the cross-correlations. The Doppler difference threshold and C/No thresholds are referred to herein as Doppler and C/No "masks." In accordance with the first embodiment, if the difference between the C/No measurements exceeds a given C/No threshold, and if the difference of the Doppler measurements (taken modulo 1 kHz) falls within the Doppler difference threshold, then the weaker measurement is identified as a cross-correlation. These cross-correlations are shown in FIG. 9 as the mainlobe energy peaks 902, 904 and 906. Although the worst-case correlation power is −211 dB (as described above), noisy C/No estimates and errors in peak interpolation can reduce this margin by several dB.

As shown in FIG. 9, the mainlobe cross-correlations (902, 904 and 906) also have frequency sidelobes. For example, the mainlobe cross-correlation 902 has frequency sidelobes 908, 910. Similarly, the mainlobe cross-correlation 904 has frequency sidelobes 912, 914. The mainlobe cross-correlation 906 has frequency sidelobes 916, 918. The frequency sidelobes appear approximately three frequency bins away from their respective and associated mainlobes. The frequency sidelobes are approximately 13 dB less than their associated mainlobes. In the search Modes 1 and 2 (states 802 and 804, respectively, of the search mode state machines described above with reference to FIGS. 8a and 8b), three frequency bins equal 75 Hz. In Mode 3 (state 806 of FIGS. 8a and 8b), three frequency bins equal 9.375 Hz.

Referring again to the cross-correlation detection regions shown in FIG. 9, another phenomenon of interest occurs during Mode 3 searches (state 806 of FIGS. 8a and 8b). As described above with reference to the second embodiment of the GPS search mode architecture and the search mode parameters shown in Table 4, the coherent integration time extends to 160 ms in Mode 3 searches. Due to this extended coherent integration time, a sample-and-hold filter produces yet another set of cross-correlations (referred to as "sample-and-hold" cross-correlations). These cross-correlations are shown in FIG. 9 as energy peaks 920. Although the sample-and-hold cross-correlations 920 appear at multiples of 125 Hz, they are especially strong at 1 kHz+/−125 Hz frequencies. They are approximately 12 dB down relative to the cross-correlation mainlobes. The 1 kHz+/−250 Hz sample-and-hold cross-correlations appear 6 dB down relative to the 1 kHz+/−125 Hz sample-and-hold cross-correlations, and the remaining sample-and-hold cross-correlations fall further still. When the coherent integration length is 80 ms (for example, when operating in the "Low Mode" (state 806, FIG. 8a), the sample-and-hold cross-correlations occur with 250 Hz spacing.

In accordance to one embodiment of the present cross-correlation mitigation method, C/No and Doppler difference thresholds are selected depending upon the search mode of the weaker measurement. A pair of C/No and Doppler masks (or more simply, "Doppler masks") are selected for each search mode (such as those described above with reference to FIGS. 8a and 8b). Exemplary C/No and Doppler masks are shown below in Table 5.

TABLE 5

Exemplary C/No and Doppler Masks for Cross-correlation Detection

|  | C/No | Dopp | DoppMod | C/No | Dopp | DoppMod |
|---|---|---|---|---|---|---|
| High | 14 | 20 | 1000 | 25 | 100 | 1000 |
| Medium | 12 | 20 | 1000 | 21 | 100 | 1000 |
| Low | 14 | 5 | 1000 | 25 | 25 | 250 |

The first C/No and Doppler mask pair captures the cross-correlation mainlobes (e.g., the cross-correlation mainlobes 902, 904 and 906 of FIG. 9). The second C/No and Doppler mask pair captures the frequency sidelobes (e.g., the frequency sidelobes 908, 910 of FIG. 9). When searching in the Low Mode (state 806 of FIGS. 8a and 8b), the second C/No and Doppler mask pair is taken modulo 250 Hz to capture the sample-and-hold cross-correlation spurs (e.g., the sample-and-hold cross-correlations 920 of FIG. 9).

In accordance with one embodiment, each SV measurement is compared to every other SV measurement. For each given SV measurement pair, the stronger SV is determined based on C/No estimates. The absolute value of the C/No difference (referred to as "cnoDiff") is calculated. The absolute value of the Doppler difference is calculated, and computed modulo 1 kHz (referred to as "doppDiff"). Thresholds may then be selected to capture the mainlobe, frequency sidelobes, and sample-and-hold cross-correlations described above. For example, Table 6 below shows exemplary thresholds that can be used to capture the above-described cross-correlations. The threshold values shown below in Table 6 for Mode 2 searches apply to both M=20 and M=44. The values shown for Mode 3 searches apply to both M=5 and M=11.

TABLE 6

Exemplary C/No and Doppler Masks for Cross-correlation Detection

|  | ΔC/No 1 | ΔDopp 1 | ΔC/No 2 | ΔDopp 2 | ΔC/No 3 | ΔDopp 3A | ΔDopp 3B |
|---|---|---|---|---|---|---|---|
| Mode 1 | 15.9 | 22 |  |  |  |  |  |
| Mode 2 | 17.3 | 22 |  |  |  |  |  |
| Mode 3 | 18 | 5 | 33 | 11 | 31 | 123 | 127 |

To detect mainlobe cross-correlations, the absolute value of the C/No difference (cnoDiff) is compared to the threshold value ΔC/No 1 given in Table 6. If the absolute value of C/No difference (cnoDiff) is greater than ΔC/No 1, and if doppDiff is less than the threshold value of ΔDopp 1 (given in Table 6 above), then the RMSE of the weaker signal is saturated. If the weak measurement is found during the search Modes 1 or 2, the cross-correlation detection method is aborted at this point. Otherwise, in order to detect the frequency sidelobe cross-correlations, cnoDiff is compared to the threshold value of ΔC/No 2 (given in Table 6 above). If cnoDiff is greater than ΔC/No 2, and doppDiff is less than ΔDopp 2, then the RMSE of the weaker measurement is saturated. Otherwise, to detect the sample-and-hold cross-correlations, if cnoDiff is greater than ΔC/No 3, and doppDiff is greater than ΔDopp 3A (Table 6), and doppDiff is less than ΔDopp 3B (Table 6), then the RMSE of the weaker measurement is saturated.

In another embodiment, instead of saturating the RMSE of the detected cross-correlation measurement, different protocols may be implemented that permit the GPS receiver (Mobile Station) to specify that a detected measurement is identified as a potential cross-correlation. In this embodiment, the MS may identify a measurement as a suspected cross-correlation, provide this information to a PDE, thereby allowing the PDE to attempt solutions with and without the suspicious measurement. In such an embodiment, if the solutions are relatively close to one another, the PDE may determine that the suspicious measurement is not a cross-correlation. In such a scenario, the PDE may decide to use the measurement after all.

Note that the C/No 1 masks shown in Table 6 are generally greater than those shown in Table 5, because the C/No estimates can be improved by interpolation of bias correction tables. The Doppler masks are increased for the search Modes 1 and 2. The Mode 3 Doppler variance is decreased due to the increase in coherent integration times. The 160 ms coherent integration time permits finer estimates of frequency. Consequently, the Mode 3 Doppler 1 mask can be reduced to approximately 2.5 Hz. However, as shown in Table 6, the Doppler 1 threshold is given at 5 Hz to provide a useful safety margin in frequency. This margin may be needed because the interfering and target SVs are generally searched during different visits. Between visits, TCXO drifts and changes in Doppler may require such a safety margin. Leaving the Doppler 1 threshold at 5 Hz (instead of the possible 2.5 Hz) has a small impact on sensitivity, yet provides the above-described safety margin.

As shown in Table 6, the C/No 1 threshold increases with the increasing search modes. The thresholds are increased as a result of several factors. One factor is that the C/No estimation improves with increasing search modes (this benefit is somewhat mitigated by the fact that the increasing search modes detect weaker energy peaks). Another factor is a consequence of the longer overall integration times. Code Doppler is a more serious phenomenon in these cases, which reduces cross-correlation power. As the cross-correlation power decreases, the C/No 1 masks are increased.

"Mainlobe" Cross-Correlation Test-Wide Doppler Masks to Account for BPSK Data Modulation The cross-correlation tests described above do not account for the effects of GPS data bit modulation. In typical GPS systems, the data bits are modulated with a period of 20 ms. This has the effect of reducing cross-correlation power after coherent integration. The effect is most significant when performing Mode 3 searches. Because coherent integration spans 160 ms (a duration of eight data bits) when searching in this mode, multiple bits within the coherent integration period can cancel each other out. For example, assume that the eight modulation bits for an interfering SV comprise the following sequence: "01010101". Also, assume that the eight modulation bits for the target SV comprise the following sequence: "11101110". In this example, assume that the bit boundaries of two SVs are perfectly aligned. An exclusive OR operation of the two SV data bit sequences yields the following data bit sequence: "10111011". If the logical 1 values are mapped to a voltage of −1, and the logical 0 values are mapped to a voltage of +1, coherent integration over the interval yields a value of −4. If the modulation bits are disabled for both SV's (i.e., if the data bits are not modulated), the coherent integration would result in a value of −8. Thus, the modulation bits can significantly reduce cross-correlation power in Mode 3 searches.

Because the search Modes 1 and 2 have a coherent integration length of 20 ms, the benefits of bit modulation are somewhat reduced for these modes. To the extent that the bit boundaries of the interfering and target SV's disagree, some cancellation is possible. However, this cancellation is not a significant factor in selecting C/No masks for the search Modes 1 and 2. Conditions are best when the bit boundary of the interfering SV falls exactly at the middle of the coherent integration of the target SV.

The frequency response of a cross-correlation sequence can be characterized as follows. Assume a fixed time offset between the interfering satellite and the code phase hypothesis being searched. In one embodiment, the output from the receiver (such as the receiver 200 of FIG. 2) is a 1024-chip accumulation of the cross-correlation signal, which can be approximated as a 1023-chip 1 ms sum. In another embodiment, the GPS receiver hardware accumulates 1023-chip sums, aligned to the 20 ms bit boundaries. In the absence of noise and bit modulation, this signal can be represented by the constant value 1. The partial sums are then processed by a 20-point DFT.

The partial sums and the resulting frequency response are shown in the top two sub-frames of FIG. 10 (sub-frames 1010 and 1020). The properties of the frequency response have been described above. For example, as shown in the sub-frame 1020 of FIG. 10, the strongest cross-correlations lie at multiples of 1 kHz, with sidelobes 75 Hz on either side, suppressed by 13 dB. However, as shown in a third and fourth sub-frames 1030, 1040, respectively, of FIG. 10, the frequency response changes in the presence of data bit modulation such as BPSK modulation. Bit modulation tends to spread the cross-correlation energy in frequency. In order to capture the cross-correlation effects as impacted by bit modulation, different Doppler and C/No masks are required (i.e., different Doppler and C/No masks than those described above with reference to Tables 5 and 6). In general, the method and apparatus described herein use wider Doppler masks than those described above to capture cross-correlations impacted by data bit modulation. In addition, BPSK modulation tends to reduce the maximum energy peak height of the cross-correlations. Consequently, the Doppler masks can be reduced as compared to the Doppler masks described above. An exemplary data bit sequence is shown in the third sub-frame 1030 of FIG. 10.

The exemplary data sequence shown in the third sub-frame 1030 comprises a series of ten positive "ones" (data having a positive 1 volt value) followed by a sequence of ten negative "ones" (data having a negative 1 volt value). The resulting frequency response has a zero DC component, with sidelobes occurring at +/−50 Hz. The sidelobes are suppressed by approximately 3 dB relative to the mainlobe. Therefore, in order to properly detect and identify cross-correlations in the presence of data bit modulation (such as BPSK modulation), wider Doppler masks are used to account for the impact of the modulation.

Similar observations can be made for the Mode 3 search mode, in which coherent integration length extends to 160 ms. In the case without bit modulation, the frequency response appears the same as that shown in the second sub-frame 1020 of FIG. 10, with the exception that the frequency axis is scaled by ⅛.

The top two sub-frames of FIG. 11, sub-frames 1110 and 1120, display results of another exemplary data sequence. As shown in FIG. 11, in this sequence, polarity alternations occur each 10 ms. Two alternations may occur each 20 ms, one caused by a transmitting SV and one induced by the receiver correlation hardware. For purposes of FIG. 11, it is assumed that the alternations are spaced 10 ms apart. As shown in the second sub-frame 1120 of FIG. 11, sidelobes are generated at 50 Hz, 150 Hz, 250 Hz and 350 Hz. The sidelobes are weaker with increasing distance from 0 Hz. The bottom two sub-frames of FIG. 11, sub-frames 1130 and 1140, display the effects that a randomly constructed data sequence has on cross-correlation. As shown in the fourth sub-frame 1140, the random data sequence produces lobes occurring throughout the 0 Hz to 100 Hz region.

FIGS. 10 and 11 display "pessimistic" scenarios in the sense that they depict data sequences having zero DC components (with the exception of the top sub-frames of FIG. 10). Sidelobe effects will be reduced for data sequences having nonzero DC components. This can occur, for example, when the bit transitions are not spaced apart exactly at 10 ms intervals. In such cases, the frequency spectrum would include a weak DC component as well as sidelobes that are weaker than the ones shown in FIGS. 10 and 11.

As described above, to account for the effects of data bit modulation upon cross-correlation spurs, different C/No and Doppler masks are used in implementing the above-described cross-correlation tests. Table 7 below shows an exemplary listing of C/No and Doppler masks that can be used to account for the impact that data bit modulation has on cross-correlation spurs. As those skilled in the GPS data processing arts shall recognize, the thresholds shown in Table 7 are exemplary only and are not meant to be all-inclusive. Other C/No and Doppler masks can be used. If desired, for simplicity of implementation, the "Medium 44" and "Low 11" thresholds shown in Table 7 can be replaced with the "Medium 20" and "Low 5" thresholds.

TABLE 7

Exemplary C/No and Doppler Masks for Cross-correlation Detection (to account for data bit modulation)

|  | ΔC/No 1 | ΔDoppA | ΔDoppB |
|---|---|---|---|
| High | 15.9 | 0 | 22 |
| High | 18 | 0 | 45 |
| Med 20 | 17.3 | 0 | 22 |
| Med 20 | 21 | 0 | 45 |
| Med 44 | 17.3 | 0 | 22 |
| Med 44 | 22 | 0 | 45 |
| Low 5 | 18 | 0 | 5 |
| Low 5 | 31 | 123 | 127 |
| Low 5 | 26 | 0 | 45 |
| Low 5 | 23 | 48 | 52 |
| Low 5 | 28 | 98 | 102 |
| Low 11 | 18 | 0 | 5 |

TABLE 7-continued

Exemplary C/No and Doppler Masks for Cross-correlation Detection (to account for data bit modulation)

|  | ΔC/No 1 | ΔDoppA | ΔDoppB |
|---|---|---|---|
| Low 11 | 31 | 123 | 127 |
| Low 11 | 28 | 0 | 45 |
| Low 11 | 25 | 48 | 52 |
| Low 11 | 32 | 98 | 102 |

In addition to the "mainlobe" cross-correlation test described above, the cross-correlation mitigation method and apparatus herein also includes other cross-correlation tests that can improve the performance of GPS receivers. These tests may be used in addition to, or optionally with, the mainlobe cross-correlation test. The first such test is referred to as the "Variable C/No Cross-correlation test" and is described below.

"Variable C/No" Cross-Correlation Test

Because GPS code Doppler spreads out cross-correlation energy across multiple code phases when Doppler difference is high, stricter C/No thresholds can be used when the Doppler difference between the target SV signal and the weaker measurement is high. If the Doppler difference is quite large (e.g., on the order of 5 to 6 kHz), it is associated with a non-zero code Doppler. The difference in energy peaks drifts over time. The cross-correlations become weaker for high Doppler differences. Because the cross-correlations are weaker for high Doppler differences, more aggressive Doppler masks can be used in these cases. The drift effects are more pronounced during the search modes having long total integration times. Therefore, the more aggressive Doppler thresholds are most effective during the deeper search modes (Modes 2 and 3, described above with reference to the state diagrams of FIGS. 8*a* and 8*b*). For example, in one embodiment, a worst case code Doppler is 1.023e6 * 9 kHz/1.5 GHz, which is equal to 6 chips/second. Over the Mode 3 search duration (described above with reference to FIG. 8*b*) of 2 seconds, a loss of 11 dB results.

Figure 12A:
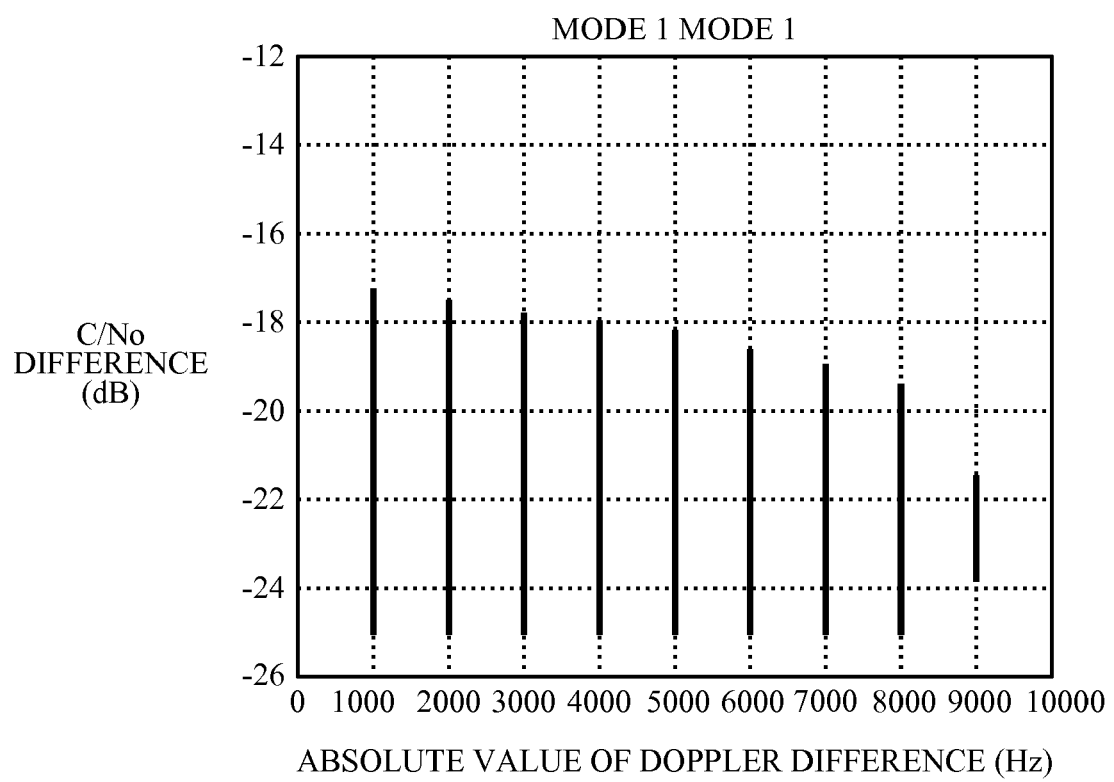
FIGS. 12a-12c show cross-correlation C/No distributions as a function of an absolute value of Doppler difference for three exemplary search modes.
Figure 12B:
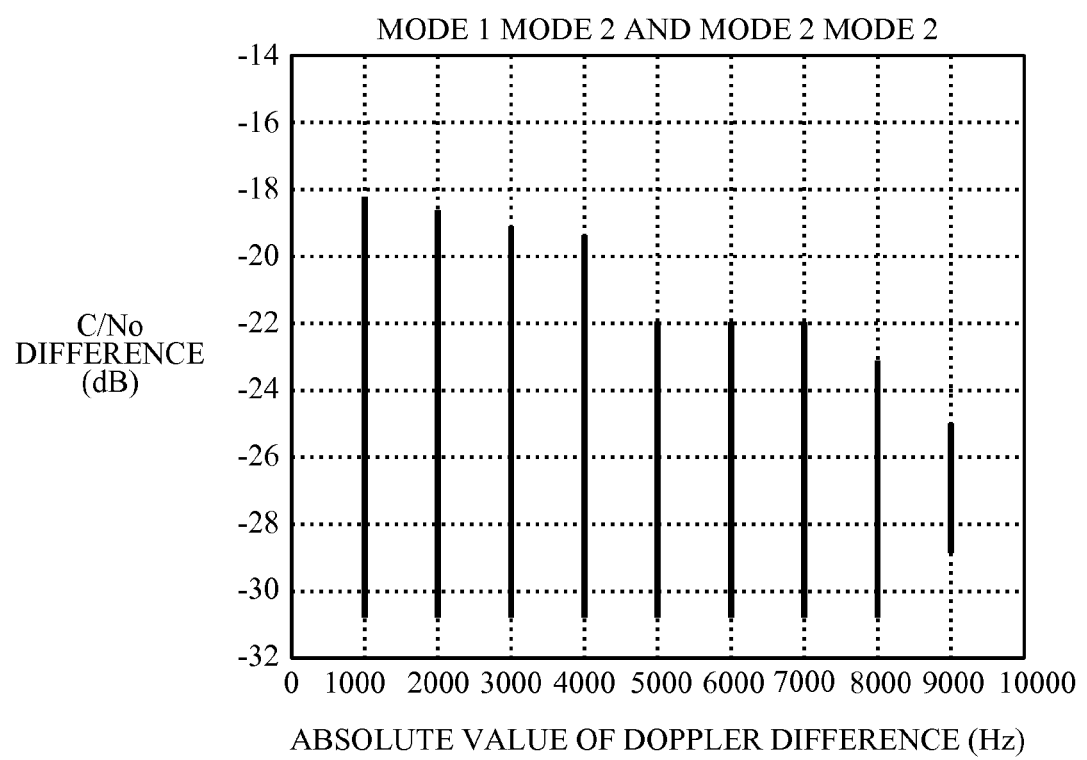
Figure 12C:
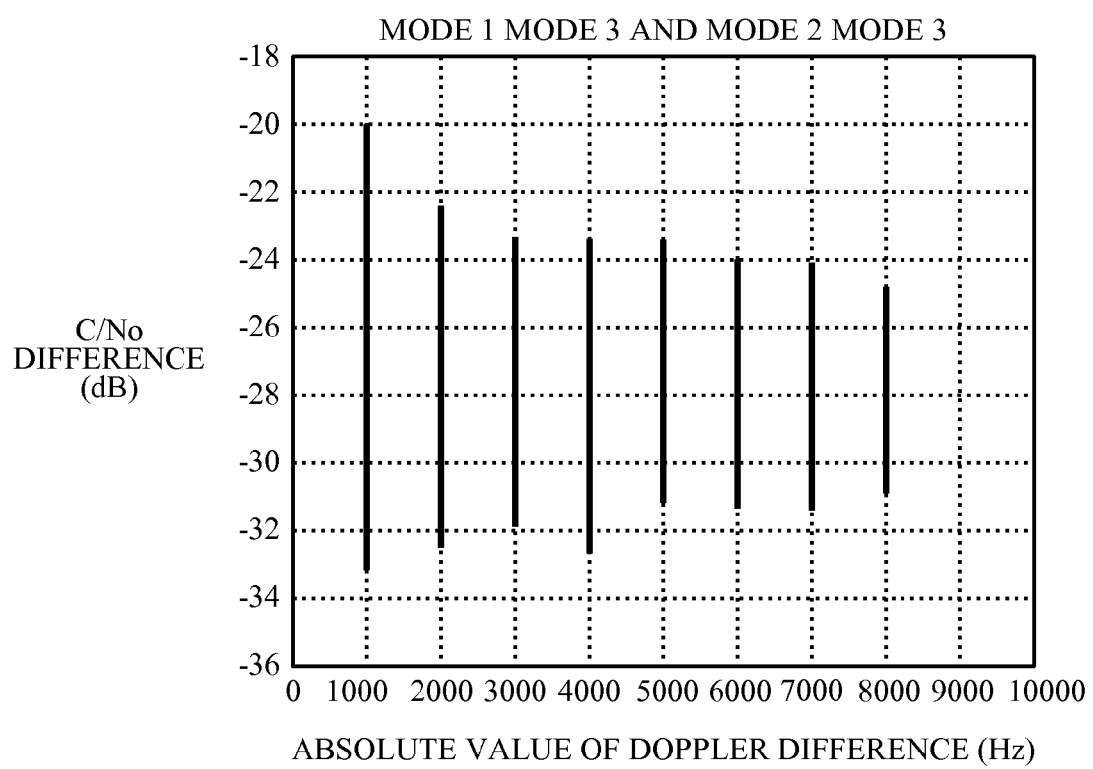

FIGS. 12*a*, 12*b*, and 12*c* show the cross-correlation C/No distributions as a function of an absolute value of Doppler difference for the three search modes described above with reference to FIGS. 8*a* and 8*b*. The Doppler differences are not taken modulo 1 kHz in FIGS. 12*a*-12*c*. More specifically, FIG. 12*a* shows the cross-correlation C/No distribution as a function of the absolute value of Doppler difference for the Mode 1 search (having the shortest total integration of the three search modes, 1, 2 and 3). FIG. 12*b* shows the cross-correlation C/No distribution as a function of the absolute value of Doppler difference for the Mode 2 search (having a total integration time that is longer than the Mode 1 searches). Finally, FIG. 12*c* shows the cross-correlation C/No distribution as a function of the absolute value of Doppler difference for the Mode 3 search (having the longest total integration time).

As expected, and referring now to FIG. 12*a*, the C/No energy peaks (shown as vertical lines in FIG. 12*a*) are relatively equal during Mode 1 searches (i.e., the lines do not vary as a function of the absolute value of Doppler difference). However, during the deeper Mode 2 (FIG. 12*b*) and Mode 3 (FIG. 12*c*) searches, both having longer total integration lengths, the lines tend to decrease as the absolute value of the Doppler difference increases.

As a consequence, sensitivity and efficiency of the cross-correlation tests are increased by varying the C/No thresholds provided above (with reference to Tables 5-7) as a function of the absolute Doppler difference. For example, for Mode 3 searches (FIG. 12c), with M=11, the gain in sensitivity is approximately 1.5 dB at 5 kHz. This gain is reduced somewhat for M=5.

The "strong" cross-correlation test is now described. This test is used to detect relatively "strong" cross-correlations that occur when multiple SVs transmit signals at the same time, and when the transmitted SV signals are spaced at a multiple of 1 kHz.

"Strong" Cross-Correlation Test

If two or more cross-correlations fall very close to each other in code phase and Doppler frequency, their energies combine to produce an energy peak that is stronger than either of the original cross-correlations. This can occur when multiple satellites concurrently transmit signals that are spaced apart at multiples of 1 kHz. For example, in one embodiment described below in more detail, cross-correlations are considered to fall close to one another when they are present in the same cell of an "energy grid", wherein the energy grid is a two-dimensional search space having code phase as a first index, and Doppler frequency as a second index. The energy grids are described below in more detail with reference to the description of both the "Wide Doppler" and "Pre-emptive" cross-correlation testing methods. Because the C/No thresholds described above with reference to Tables 5-7 are defined for single-transmitting SVs, the new energy peak (produced by the two or more close strong cross-correlations) may fall above the C/No thresholds given in the tables above.

Therefore, a "strong" cross-correlation test is included that accounts for the stronger cross-correlations created by multiple transmitting SVs. The strong correlation test is similar to the cross-correlation test described above that computes Doppler and C/No differences. However, the "strong" cross-correlation test differs from the previously described cross-correlation test in that at least two SV signals must fall within the Doppler, C/No mask before the detected peak is identified as a cross-correlation.

In addition, in accordance with the strong cross-correlation test, if the above-described multiple SV transmitter scenario is detected, the thresholds are reduced to account for the stronger cross-correlations. Specifically, to capture the stronger cross-correlation peaks, the threshold ΔC/No (shown above in Tables 6 and 7) is reduced. If the two cross-correlations agree perfectly both in code phase and Doppler frequency, the strong ΔC/No threshold should exceed the mainlobe ΔC/No threshold by approximately 3 dB. However, the cross-correlations typically do not match perfectly. Therefore, the measured peak typically only exceeds the ΔC/No threshold by 1.5 to 2 dB.

In one embodiment, the strong cross-correlation test is not triggered unless the two cross-correlations are roughly of equal strength. If one cross-correlation is significantly weaker than the other its energy contribution to the final peak is minimal. As a consequence, the resulting peak likely falls below the mainlobe ΔC/No threshold.

The "Wide Doppler" cross-correlation test is described below. The Wide Doppler cross-correlation test addresses a similar problem addressed by the "strong" cross-correlation test. However, the Wide Doppler cross-correlation test is used when multiple SV signals concurrently transmit signals that are relatively close in Doppler frequency, but not so close as to produce a cross-correlation peak of very strong energy (and thereby warranting the use of the "strong" test just described).

"Wide Doppler" Cross-Correlation Test

Figure 13A:
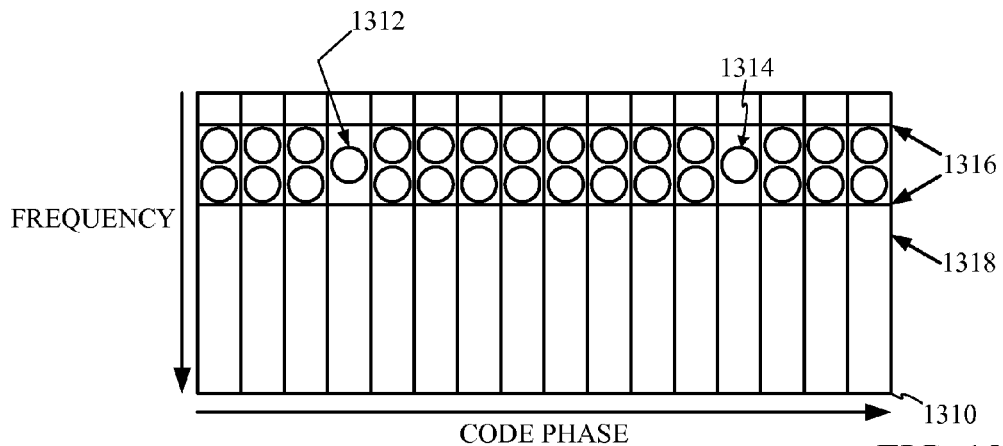
FIGS. 13a-13c show the effects on detected cross-correlations when two SVs generate cross-correlations that are relatively close to each other in both code phase and in Doppler difference.
Figure 13B:
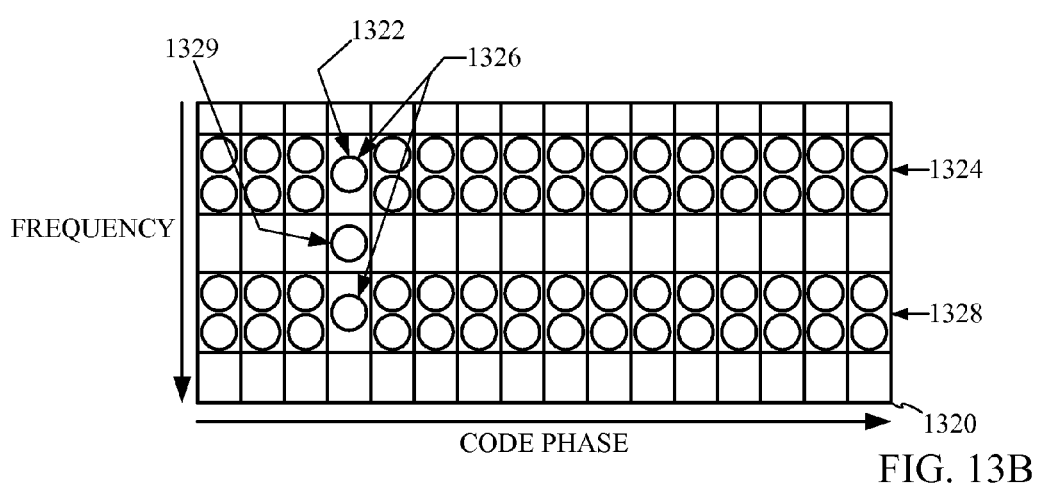
Figure 13C:
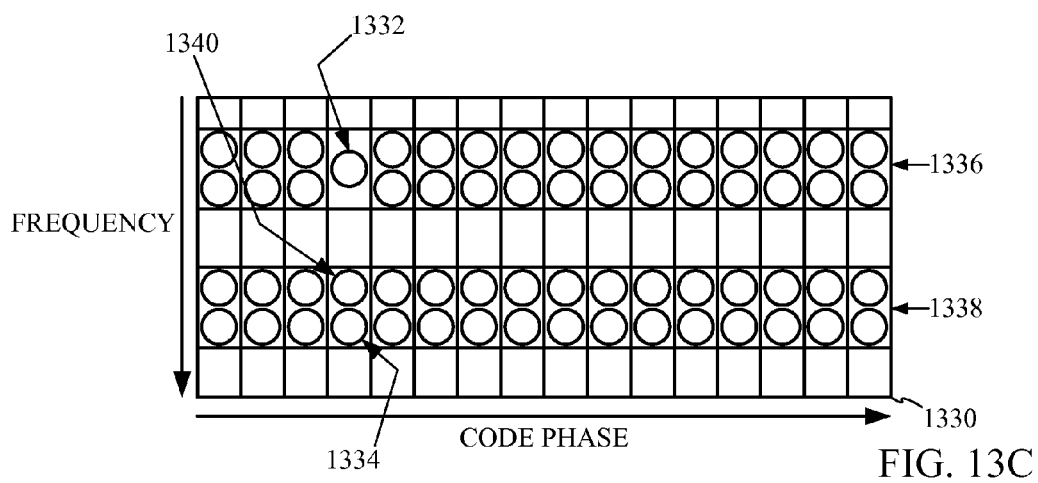

An effect that is related to the strong cross-correlation effect described above occurs when two SVs generate equal-strength cross-correlations that are relatively close to each other in both code phase and in Doppler difference. The effect can be observed by reference to FIGS. 13a-13c. FIGS. 13a-13c show energy grids 1310 (FIG. 13a), 1320 (FIG. 13b) and 1330 (FIG. 13c) that can be used to identify cross-correlation signals. As described above with reference to the "Strong" cross-correlation testing method, the energy grids comprise two-dimensional search spaces having code phase as a first index (i.e., the "x" index), and Doppler frequency as a second index (i.e., the "y" index). The energy grid 1310 of FIG. 13a shows an energy grid corresponding to a search for a first SV (e.g., SV #1) having one strong cross-correlation. The energy grid 1320 of FIG. 13b shows an energy grid corresponding to a search for the first SV (e.g., SV #1) having two equal-strength cross-correlations. The energy grid 1330 of FIG. 13c shows an energy grid corresponding to a search for the first SV (e.g., SV #1) having two unequal-strength cross-correlations. Each energy grid is described below in more detail.

Referring now to FIG. 13a, in accordance with the cross-correlation mitigation method and apparatus herein, when the frequency of a strong SV cross-correlation falls within an energy grid, any sufficiently weak energy peak that falls near the frequency of the strong cross-correlation is also identified as a cross-correlation. For example, as shown in FIG. 13a, when the frequency (taken modulo 1 kHz) of a strong SV falls in the energy grid 1310, a shaded frequency region is identified (e.g., shaded frequency region 1316) and used to identify other peaks that fall within the region as cross-correlations. Assume that a first strong SV signal (e.g., generated by a second SV, labeled SV #2) falls within the energy grid 1310 at a first frequency. This is shown in FIG. 13a as dotted line 1314. A second, much weaker energy peak 1312 (for example, generated by another SV) occurs within the energy grid 1310 at the same first frequency. In this case, the weaker energy peak 1312 is identified as a cross-correlation because it falls inside of the shaded frequency region 1316. The center of the Doppler frequency bins is shown by the designator 1318 in FIG. 13a.

Referring now to FIG. 13b, when two SVs transmit equally strong satellite signals that are close in frequency, their corresponding cross-correlation signals may result in an energy peak being produced that falls outside of the frequency bands of each of the corresponding cross-correlation signals. For example, as shown in FIG. 13b, a first strong SV signal (taken modulo 1 kHz, and e.g., generated by the SV #2) produces a first strong cross-correlation peak 1322 that falls within a first shaded frequency region 1324. A second strong SV signal (taken modulo 1 kHz, and e.g., generated by another SV, SV #3) produces a second strong cross-correlation peak 1326 that falls within a second shaded frequency region 1328. However, unlike the scenario described above with reference to FIG. 13a, because both SV signals are equally strong, a third energy peak 1329 is produced. As shown in FIG. 13b, due to interpolation effects (performed in both the code and frequency spaces on both of the strong peaks 1322 and 1326), the third energy peak 1329 lies at a Doppler frequency that is between the Doppler frequencies of the two strong peaks 1322, 1326. Consequently, the third cross-correlation energy peak 1329 falls outside of the shaded frequency regions 1324, 1328, and may go undetected unless special provisions are made for this scenario.

The phenomenon described above with reference to FIG. 13b occurs in search Mode 1 (described above with reference to FIGS. 8a, 8b) when two equal-strength cross-correlations produced by two SVs are close in code phase (for example, less than 0.5 chips apart) and separated by a Doppler difference that is approximately between 45 and 70 Hz. Under these conditions, the energy peak produced by the two equal-strength cross-correlations will lie between the two true peaks. Because the interpolated peak lies between the true peaks, the Doppler difference may fall outside the mainlobe Doppler threshold described above and fail to be detected.

Further, the phenomenon described above occurs very rarely. Its occurrence depends upon several conditions all of which must be satisfied for the effect to be manifest. First, the cross-correlations (e.g., the peaks 1322 and 1326 of FIG. 13*b*) must be of nearly equal strength. Otherwise, the stronger cross-correlation will pull the interpolated peak towards itself and within its shaded frequency region. This is shown in FIG. 13*c* and described below in more detail. Second, the Doppler separation between the two equal-strength cross-correlations must be approximately between 45 and 70 Hz. If the Doppler separation is less than approximately 45 Hz, the interpolated peak will fall within the mainlobe threshold of one of the two equal strength cross-correlation peaks. If the Doppler separation is greater than approximately 70 Hz, the cross-correlations will resolve into separate peaks. Third, the cross-correlations must be within approximately 1 chip of each other in code phase. Moreover, the above-described phenomenon rarely occurs in search Modes 2 and 3, because cross-correlation strength is more variable in these search modes.

The Wide Doppler cross-correlation test is similar to the Strong cross-correlation test described above. If at least two SV signals fall into a Doppler, C/No mask, the energy peak is identified as a cross-correlation. The C/No mask is identical to that used for the mainlobe C/No mask (e.g., see Tables 5-7 above). However, the width of the Doppler mask is increased as compared to the Doppler mask described above with reference to Tables 5-7. Additionally, and in contrast to the Strong cross-correlation test described above, the peak Doppler value must lie between the Doppler values of the two cross-correlations.

As described above, if one cross-correlation is much stronger than another, the stronger cross-correlation will pull the interpolated peak towards itself and within its shaded frequency region. This is shown in the energy grid of FIG. 13*c*. FIG. 13*c* shows the energy grid 1330 corresponding to a search for a first SV, SV #1, with two unequal-strength cross-correlations (one relatively weak cross-correlation 1332, and one relatively strong cross-correlation 1334). The weak cross-correlation 1332 falls within a first shaded frequency region 1336 defined by a second SV signal (taken modulo 1 kHz), produced by a second SV, (e.g., an SV #2). The strong cross-correlation 1334 falls within a second shaded frequency region 1338 defined by a third SV signal (taken modulo 1 kHz), produced by a third SV, (e.g., an SV #3). As shown in FIG. 13*c*, when the two cross-correlations 1332, 1334 are present in the same energy grid, and one (1334) is significantly stronger than the other (1332), the interpolated peak 1340 is pulled toward the stronger cross-correlation 1334, and typically falls within the shaded frequency region of the stronger SV (in FIG. 13*c*, the interpolated peak 1340 is shown as falling within the second shaded frequency region 1338 defined by the SV #3). As described above, the present Wide Doppler cross-correlation test would not be necessary in this case. The "Pre-emptive" cross-correlation test is now described.

Pre-Emptive Cross-Correlation Test

In some embodiments, cross-correlation testing (such as testing using the methods described above) is performed only after the satellite signal search modes are completed and a single peak is selected for each energy grid (e.g., the energy grids described above with reference to FIGS. 13*a*-13*c*). Unfortunately, errors can result when cross-correlation testing is delayed until after, rather than during (or before), the energy peak per grid selection process. For example, if the true energy peak (the SV signal of interest) is weaker than a strong cross-correlation peak (or, for that matter, weaker than a second or third strong cross-correlation peak) in the same energy grid, in some embodiments, the stronger cross-correlation measurement is saved for subsequent cross-correlation testing, while the true peak is discarded. Although the stronger peak may later be identified (by cross-correlation testing) as a cross-correlation, the true peak is no longer available for subsequent processing. Therefore, in order to recover the true peak, a new search must be performed resulting in wasted time and processing resources. The present pre-emptive cross-correlation testing method addresses this phenomenon and prevents erroneous, or at least undesired, deletion of true energy peaks prior to the performance of cross-correlation testing.

As described above with reference to FIGS. 13*a*-13*c*, one embodiment uses search energy grids in locating SV and cross-correlation signals. As described above, the search energy grids are two-dimensional search spaces indexed by code phase (taken along the "x" axis of the grid) and frequency (taken along the "y" axis of the grid). Although these dimensions may be varied, for the described embodiment, it is assumed that the energy grids have fixed dimensions. In one embodiment, 32 GPS chips are obtained in one span, and 20 frequency bins. The frequency bins may comprise 20 times 25 Hz (for the high search modes). In the case of lower search modes, where the searches have longer coherent integration lengths, depending upon the search mode used, the frequency bins may comprise either 20 times 6.25 ("25/4") Hz or 20 times 3.125 ("25/8") Hz.

In one embodiment, a search is performed for every SV signal. All of the satellite signal measurements obtained during the search are logged into a database for further processing. For example, in one embodiment, a high mode search, or Mode 1 search (described above with reference to the state machines of FIGS. 8*a* and 8*b*, and specifically with reference to state 802) is performed for every SV. In this embodiment, ten of the strongest detected satellite signals are obtained for each search energy grid. Those skilled in the communications and data processing arts shall appreciate that the use of ten peaks is exemplary only and that any convenient number of energy peaks may be used. In this embodiment, ten local maxima energy peaks are stored in each search energy grid. Once ten local maxima energy peaks are obtained for each search grid, the peaks are sorted based upon predetermined peak selection criteria. As a result of the sorting process, a single energy peak is selected for each search energy grid. Note that a search energy grid may have no energy peaks if the search fails to detect a sufficiently strong energy peak.

Several different peak selection criteria can be used in practicing the peak selection process. Those skilled in the communications arts shall recognize that the peak selection criteria described herein are given as examples only. For example, assume that two peaks fall within 2 or 3 chips of each other. In accordance with a first peak selection criterion, the peak that occurs earlier is selected, and the later occurring peak is discarded. In accordance with this selection criterion, the earlier occurring peak is selected even when it is weaker than the later occurring peak. The rationale for this selection criterion is that the later occurring peak may comprise a refection of a satellite signal (for example, an SV signal reflected off of a nearby mountain). Reflected peaks (i.e., peaks that are attenuated) are not as useful for SV signal detection purposes as are un-reflected peaks (i.e., un-attenuated peaks that are presumably line-of-sight to the receiver).

Other peak selection criteria can be used in selecting a peak for each energy grid. Regardless of the criteria used, in this embodiment, without the use of pre-emption (as described below in more detail), one energy peak per grid remains after peak selection is performed. All of the energy grids are sorted in this manner and one peak is selected for each SV. Therefore, without pre-emption, after each search mode, only one peak remains for each SV.

In accordance with the pre-emptive approach, cross-correlation testing is executed early in the search process and before selection of the energy peaks. In accordance with this approach, cross-correlation testing is performed, not after a single energy peak is selected for each SV, but rather, during the selection process while ten peaks still remain within each search energy grid. Stated in another manner, the cross-correlation testing is performed during the search process. This implies that the other measurements from the current search mode are not yet completed. Therefore comparisons are made only to peaks found in previous search modes. In particular, the pre-emptive test is not available for use in high search modes.

In accordance with the present pre-emptive cross-correlation test, as the search process is progressing, a running list of all "trusted" strong peaks is maintained. During processing of the ten peaks per energy grid, cross-correlation testing is performed and cross-correlations are identified. If a first energy peak in a search grid is weaker than a second energy peak, but the second peak is identified as a cross-correlation (by a cross-correlation testing process), the first energy peak (i.e., the true peak) can be saved for further processing and is therefore not discarded. This saves subsequent searches that otherwise would be required in the absence of pre-emptive cross-correlation testing methods.

In simulation, the results obtained using the pre-emptive cross-correlation test closely matched those obtained using the cross-correlation tests described above, despite use of coarser estimates of C/No and Doppler. Because the distributions were virtually identical to those of the cross-correlation tests described above, the same thresholds as those described above (e.g., see Tables 5-7) can be used in practicing the pre-emptive test. However, those skilled in the communications and data processing arts shall recognize that other thresholds can be used in practicing the pre-emptive cross-correlation test. The thresholds provided are given as examples only.

MS-Based Mode of Operation—An Exemplary Embodiment

As noted in the MS-Assisted embodiments described above, in MS-Assisted modes of operation, cross-correlation spurs can cause the MS (GPS receiver) to report incorrect measurements to the PDE. These measurements can and often do corrupt the quality of SV detection and tracking. However, the detrimental effects of cross-correlations are limited in the MS-Assisted embodiments, because the PDE is often able to identify and disregard the incorrect measurements reported by the MS. As noted above however, cross-correlations pose an increased risk in the MS-Based modes of operation. This is because, in the MS-Based embodiments, the received signal peaks are used to re-center and narrow search windows used to identify subsequent SVs. Consequently, unless mitigated, cross-correlation spurs can cause the MS to never detect the remaining SVs. An exemplary MS-Based cross-correlation mitigation method and apparatus is now described.

GPS Search Method for Use with MS-Based Embodiments

Similar to the embodiments described above, in the MS-Based embodiments, GPS satellite signals are searched in accordance with an MS-Based GPS search sequence. In one embodiment, the MS-Based GPS search sequence is implemented in software and is resident in an integrated circuit (IC) within the GPS receiver. However, those skilled in the GPS communications and software design arts shall recognize that other embodiments of the MS-Based GPS search sequence are possible. In one embodiment, similar to the GPS Search Mode Architecture described above, the MS-Based GPS search sequence includes different levels of search modes, each having different coherent integration lengths and varying degrees of sensitivity.

Figure 14:
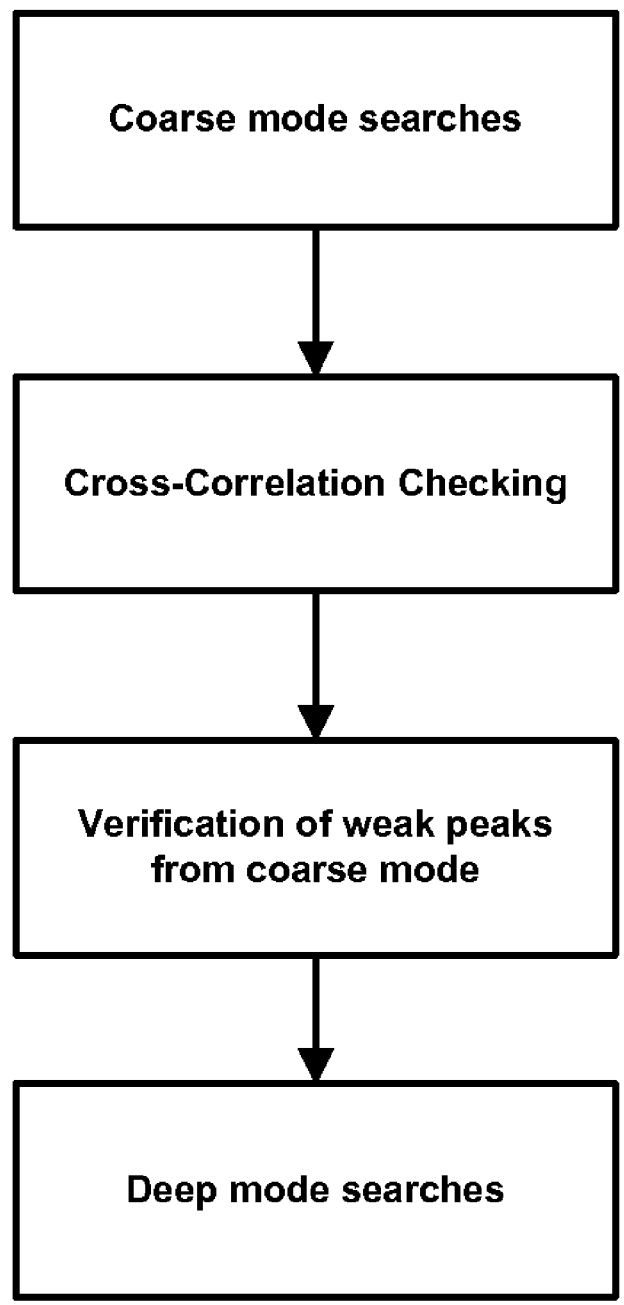
FIG. 14 is a simplified high-level flowchart of an exemplary MS-Based GPS search sequence.

An exemplary MS-Based GPS search sequence is shown in FIG. 14. As shown in FIG. 14, similar to the GPS Search Mode Architectures described above with reference to FIGS. 8a and 8b, a reduced-sensitivity coarse search (indicated in FIG. 14 as "Coarse mode searches") is first performed in order to quickly identify SVs transmitting the strongest signals. After the coarse mode searches are performed, processing proceeds to perform cross-correlation checking. After performing some cross-correlation checking, the weaker peaks found during the coarse search are verified. After verification, deep search modes are performed to identify the remaining SVs.

Figure 15:
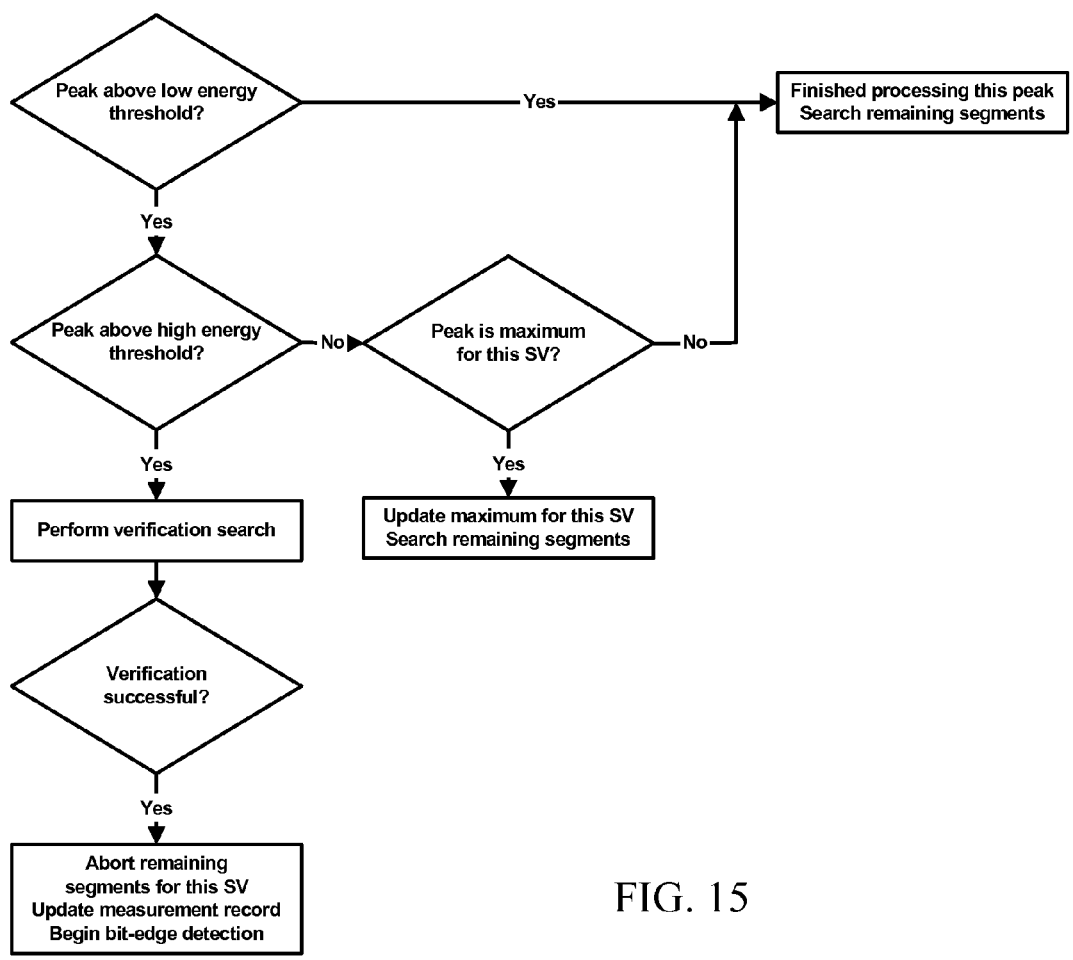
FIG. 15 is a detailed flowchart showing exemplary processing used to implement coarse mode search processing shown in the flowchart of FIG. 14.

FIG. 15 is a flowchart showing exemplary processing used to implement the coarse mode searches of FIG. 14. The entire code phase and Doppler space is searched for each SV. As shown in FIG. 15, two energy thresholds ("low" and "high" energy thresholds) are used. The high energy threshold represents a C/No measurement above which no cross-correlations are expected to be found. The low energy threshold represents a threshold which prevents false alarms caused by noise. Because peaks that exceed the high energy threshold can be trusted, they are verified immediately. If verified, they are used to narrow Doppler and code phase windows for the remaining SVs.

For each SV, the maximum of all peaks that fall between the two energy thresholds (i.e., "weak" peaks) is saved. At the conclusion of coarse mode search processing, a cross-correlation test is applied to the saved weak peaks. The weak peaks that survive the cross-correlation test are verified as shown in FIG. 14 (as indicated by the processing block labeled "Verification of weak peaks from coarse mode"). As shown in FIG. 14, after verification, all SVs that have not yet been identified are searched using a "deep" mode search processing block.

Figure 16:
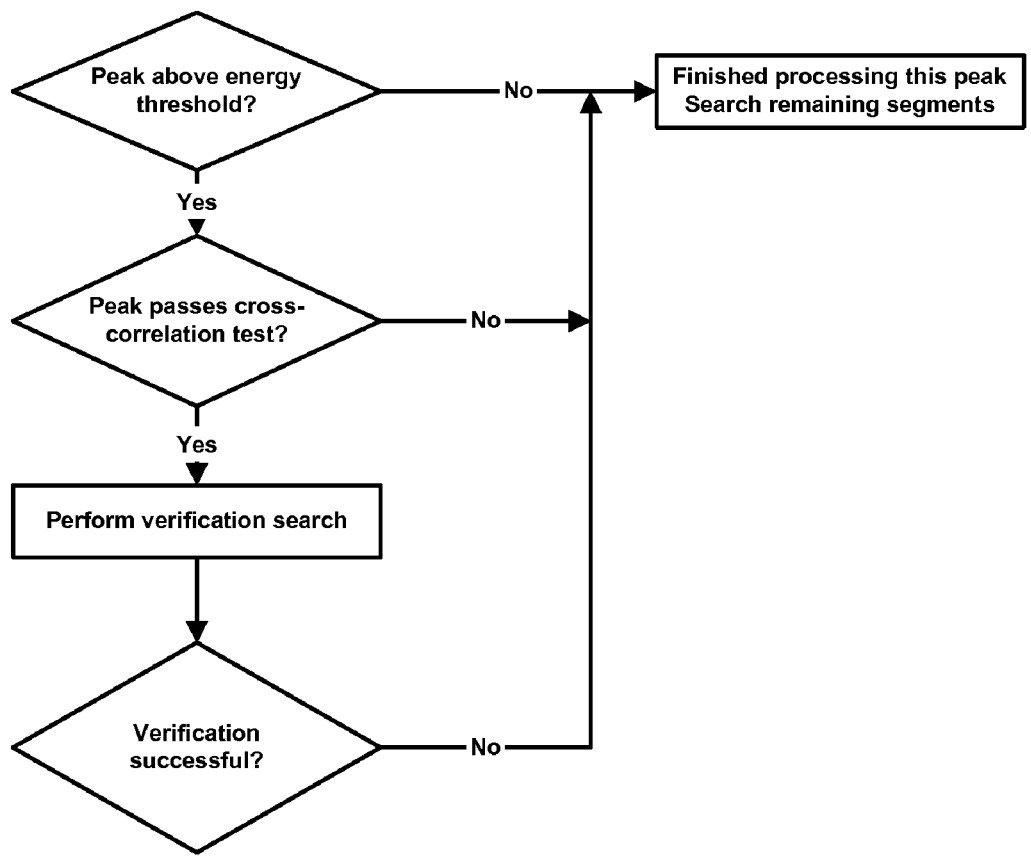
FIG. 16 is a flowchart showing exemplary processing used to implement deep mode search processing shown in the flowchart of FIG. 14.

One exemplary embodiment of the deep mode search is shown in the flowchart of FIG. 16. In this embodiment of the deep mode search processing block, only one energy threshold is used. The energy threshold is selected to prevent false alarms caused by noise. As shown in FIG. 16, each peak that exceeds the energy threshold is tested for cross-correlation properties. As shown in FIG. 16, the surviving peaks are searched in a second verification stage (which includes a second cross-correlation check).

Table 8 below shows the search parameters that may be used with the MS-Based GPS search sequence described above with reference to FIGS. 14-16. Those skilled in the GPS design arts shall recognize that the search parameters shown are given as examples only and that other parameters may be used. As shown in Table 8, the various MS-Based GPS search modes have different search lengths (i.e., different coherent, non-coherent, and total integration times) and consequently different sensitivities. For example, in the embodiment shown in Table 8, the coherent integration time for a "Coarse" mode search is 10 ms and the total integration time is 20 ms. In contrast, the coherent integration time for the deeper "Deep Verif" mode search is 10 ms and the total integration time is 640 ms. The "C/No" detection threshold value (expressed as a ratio in dB-Hz), for a Coarse mode search (strong) is 36.0 dB-Hz. In contrast, owing to the longer integration times used when performing a "Deep Verif" mode search, a lower C/No detection threshold (of 19.0 dB-Hz) can be used to detect SV signals when performing a Deep Verif mode search. As described in more detail below, in accordance with the disclosed MS-Based cross-correlation mitigation method and apparatus, because the different search modes use differing integration lengths, the detection thresholds used to mitigate against cross-correlations are varied accordingly when performing cross-correlation testing.

```
if both measurements use 20 ms PDI
    pick the appropriate masks based on the weaker measurement
else
    pick the appropriate masks based on the weaker measurement
    if the weaker SV falls within the masks
    saturate its RMSE and disregard this peak
}
```

As described in the pseudo-code set forth above, in one exemplary embodiment of the MS-Based cross-correlation detection method, the Doppler and C/No differences are computed for each pair of SV measurements. The Doppler difference is then calculated modulo 1 kHz. Based on the search mode of the weaker SV, a set of Doppler and C/No masks are obtained. In one embodiment, the set of Doppler and C/No masks are obtained from a pre-computed look-up table. In

TABLE 8

MS-Based Search Mode Parameters - Exemplary Embodiment

| Search Mode | Freq Search Space (Hz) | Num Freq Bins | Num Code Bins (cx2) | Coh Integ Time (ms) | Non-Coh Integ | Total Integ Time (ms) | Detect Thresh C/No (dB-Hz) | Sensitivity C/No (dB-Hz) | C (dBm) |
|---|---|---|---|---|---|---|---|---|---|
| Coarse (strong) | ±350 | 14 | 64 | 10 | 2 | 20 | 36.0 | ~38.0 | −133.0 |
| Coarse (weak) | | | | | | | 29.8 | ~31.9 | −139.1 |
| Verif/Deep | ±350 | 14 | 64 | 10 | 16 | 160 | 22.2 | 24.0 | −147.0 |
| Deep Verif | ±350 | 14 | 64 | 10 | 64 | 640 | 19.0 | 20.2 | −150.8 |
| Coarse 20 (strong) | ±250 | 20 | 64 | 20 | 1 | 20 | 36.0 | ~38.0 | −133.0 |
| Coarse 20 (weak) | | | | | | | 29.2 | ~30.9 | −140.1 |
| Verif/Deep 20 | ±250 | 20 | 64 | 20 | 8 | 160 | 21.1 | 22.7 | −148.3 |
| Deep Verif 20 | ±250 | 20 | 64 | 20 | 32 | 640 | 17.6 | 19.0 | −152.0 |

MS-Based Cross-Correlation Detection

As described in more detail above, the MS-Assisted cross-correlation detection methods and apparatus operate by comparing C/No and Doppler differences of pairs of SVs. These differences occur in predictable patterns when one peak is a cross-correlation spur generated by another. When a pair of measurements resembles this pattern, the weaker measurement is labeled a cross-correlation. The cross-correlation detection techniques used in one exemplary embodiment of the MS-Based cross-correlation mitigation method and apparatus are very similar to the cross-correlation techniques described above with reference to the MS-Assisted mode. One difference between the MS-Based and MS-Assisted operational modes is that the Doppler and C/No estimates are poorer when using 10 ms coherent integration lengths (i.e., Pre-detection Integration times or lengths (referred to herein after as "PDI")), because the NAV bit data is not aligned with the integration boundaries in this case. Therefore, when either of the measurements is taken with 10 ms PDI, wider C/No and Doppler masks are used than if both measurements are taken with 20 ms PDI.

One exemplary MS-Based cross-correlation detection method is shown below in pseudo-code:

```
for each pair of SVs {
    calculate the C/No difference
    calculate the Doppler difference, modulo 1 kHz
``` one embodiment, if both SVs use 20 ms PDI, a "special" table is used for this purpose. If the Doppler and C/No differences fall within the constraints of the table, the weaker SV signal is identified as a cross-correlation.

Cross-Correlation Masks—MS-Based Cross-Correlation Detection

As described above in more detail with reference to the cross-correlation tests, to account for the effects of data bit modulation upon cross-correlation spurs, different C/No and Doppler masks are used in implementing the cross-correlation tests. Table 7 above shows an exemplary listing of C/No and Doppler masks that can be used to account for the impact that data bit modulation has on cross-correlation spurs when performing MS-Assisted cross-correlation testing and mitigation. Similarly, Tables 9 and 10 below show exemplary listing of C/No and Doppler masks that can be used to account for the impact that data bit modulation has on cross-correlation spurs when performing MS-Based cross-correlation testing and mitigation. As those skilled in the GPS data processing arts shall recognize, the thresholds shown in Tables 9 and 10 are exemplary only and are not meant to be all-inclusive. Other C/No and Doppler masks can be used.

The thresholds shown below in Tables 9 and 10 are much wider in Doppler space for 10 ms PDI, both because of the asynchronous bit boundaries and because the shorter coherent integration results in a higher Doppler variance. For 20 ms PDI, the thresholds are similar to the MS-Assisted thresholds shown in Table 7 above.

TABLE 9

Cross-correlation thresholds for MS-Based Mode

| | ΔC/No | ΔDoppA | ΔDoppB |
|---|---|---|---|
| Coarse (10, 2) | 16.0 | 0 | 90 |
| Coarse 20 ms (20, 1) | 16.0 | 0 | 90 |
| Coarse Verif (10, 16) | 13.0 | 0 | 90 |
| | 18 | 0 | 150 |
| Coarse Verif 20 ms (20, 8) | 13.0 | 0 | 90 |
| | 18.0 | 0 | 130 |
| Verif Deep for bit edge (10, 64) | 13.0 | 0 | 90 |
| | 18.0 | 0 | 155 |
| Verif Deep for bit edge 20 ms (20, 32) | 13 | 0 | 90 |
| | 18 | 0 | 125 |
| Bit edge detect (20, 50) | 13.0 | 0 | 90 |
| | 18.0 | 0 | 130 |
| Long bit edge detect (20, 150) | 13.0 | 0 | 90 |
| | 18.0 | 0 | 130 |

TABLE 10

Cross-correlation thresholds for MS-Based Mode (20 ms PDI)

| | ΔC/No | ΔDoppA | ΔDoppB |
|---|---|---|---|
| Coarse 20 ms (20, 1) | 16.0 | 0 | 90 |
| Coarse Verif 20 ms (20, 8) | 15.0 | 0 | 25 |
| | 20.0 | 0 | 50 |
| Verif Deep for bit edge 20 ms (20, 32) | 17.0 | 0 | 25 |
| | 20.0 | 0 | 50 |
| Bit edge detect (20, 50) | 17.0 | 0 | 25 |
| | 20.0 | 0 | 50 |
| Long bit edge detect (20, 150) | 17.0 | 0 | 25 |
| | 20.0 | 0 | 50 |

In accordance with one exemplary embodiment of the disclosed MS-Based cross-correlation mitigation method and apparatus, a peak is identified as a cross-correlation if and only if all of the following conditions are met: (1) the absolute value of the C/No difference exceeds the ΔC/No shown in the tables; (2) the absolute value of the Doppler difference, modulo 1 kHz, is greater than or equal to the ΔDoppA shown in the tables; and (3) the absolute value of the Doppler difference, modulo 1 kHz, is less than the ΔDoppB shown in the tables.

Coarse Acquisition Noise Thresholds

Table 11 set forth below shows the maximum strength cross-correlation found as a function of the signal strength of the interfering SV. Assuming a maximum baseband SV C/No of 55 dB Hz, the strongest observed cross-correlation in either mode is 35.2 dB Hz. Therefore 36 dB Hz is selected as the strong signal energy threshold for both of the coarse acquisition modes.

The selection of the weak signal energy threshold is governed by noise false alarm probability. These were selected to have per-segment probability of $10^{-4}$. The consequent thresholds are 109 for (N=10, M=2) and 183 for (N=20, M=1). These are equivalent to 29.8 and 29.2 dB Hz, respectively.

TABLE 11

Maximum Cross-Correlation Power for Coarse Acquisition modes

| N | M | Transmit C/No | Max C/No of X-Corr |
|---|---|---|---|
| 10 | 2 | 57.5 | 36.5 |
| | | 55 | 35.2 |
| | | 52.5 | 33.2 |
| 20 | 1 | 57.5 | 36.7 |
| | | 55 | 35.0 |
| | | 52.5 | 32.6 |

A number of embodiments have been described. Nevertheless, it will be understood that various modifications may be made without departing from the scope of the invention. For example, in some embodiments, "N" SV signal peaks per bin are saved for further cross-correlation detection and mitigation processing, rather than the 10 global maxima saved over the entire grid as described above. Further, as described above, with the exception of the pre-emptive cross-correlation test, only one energy peak per SV is presented to the various cross-correlation detection methods. However, in other embodiments, multiple energy peaks per SV may be presented for subsequent cross-correlation detection and mitigation. In addition, the exemplary methods can be executed in software or hardware, or a combination of hardware and software embodiments. As yet another example, steps or acts shown or described in a particular sequence may generally be performed in a different order, except for those embodiments described in a claim that include a specified order for the steps. Accordingly, it is to be understood that the invention is not to be limited by the specific embodiments that have been described and illustrated, but only by the scope of the claims.

What is claimed is:

1. A communication apparatus comprising:
one or more antennae configured to receive signals indicative of communication information and signals indicative of location information;
a communication process module configured to process the communication information;
a location process module configured to process the location information, the location process module configured to:
perform a higher mode search using a higher mode search length and a higher mode signal detection threshold to detect one or more received signals indicative of location information;
perform a lower mode search after performance of the higher mode search, for a second length of time, using a lower mode search length and a lower mode signal detection threshold to detect one or more received signals indicative of the location information, wherein the second length of time is greater than the first length of time, the lower mode search being performed to detect one or more received signals not detected with a signal strength above a threshold level during the performance of the higher mode search; and determine cross correlation between at least one signal detected using the higher mode search and at least one signal detected using the lower mode search.

2. The communication apparatus of claim 1, wherein the one or more received signals indicative of location information include a first satellite signal and a second satellite signal.

3. The communication apparatus of claim 1, wherein the communication apparatus comprises a cellular telephone, and wherein the communication process module is adapted to process received cellular telephone signals.

4. The communication apparatus of claim 1, wherein the higher mode signal detection threshold is greater than the lower mode signal detection threshold.

5. The communication apparatus of claim 1, wherein the one or more received signals include a first received satellite signal and a second received satellite signal, wherein the higher mode search is adapted to detect the first received satellite signal and the lower mode search is adapted to detect the second received satellite signal, and wherein the location process module is adapted to determine cross-correlation between the first received satellite signal and the second received satellite signal, and wherein the location process module is further adapted to process at least one of the first received satellite signal and the second received satellite signal to remove determined cross-correlation.

6. The communication apparatus of claim 1, wherein the location process module is further adapted to perfonn a medium mode search using a medium mode search length and a medium mode signal detection threshold.

7. The communication apparatus of claim 1, wherein the location process module is implemented using hardware, software, or both.

8. The communication apparatus of claim 1, wherein the communication apparatus is adapted to determine cross correlation based, at least in part on:
comparing carrier-to-noise ratio measurements for signals of location information; and
identifying a weaker measurement as a cross correlation if a difference between the carrier-to-noise ratio measurements exceeds a predetennined carrier-to-noise threshold, and if a difference between Doppler measurements falls within a predetennined Doppler difference threshold.

9. An apparatus comprising:
means for receiving signals indicative of communication information and signals indicative of location information;
means for processing the communication information;
means for performing a higher mode search, for a first length of time, using a higher mode search length and a higher mode signal detection threshold to detect one or more received signals indicative of location information;
means for performing a lower mode search after performance of the higher mode search, for a second length of time, using a lower mode search length and a lower mode signal detection threshold to detect one or more received signals indicative of location information, wherein the second length of time is greater than the first length of time, the lower mode search being performed to detect one or more received signals not detected with a signal strength above a threshold level during the performance of the higher mode search; and
means for determining cross correlation between at least one signal detected using the higher mode search and at least one signal detected using the lower mode search.

10. The apparatus of claim 9, wherein the one or more received signals indicative of location information include a first satellite signal and a second satellite signal.

11. The communication apparatus of claim 9, wherein the communication apparatus comprises a cellular telephone, and wherein the means for processing the communication information is adapted to process received cellular telephone signals.

12. The apparatus of claim 9, wherein the higher mode signal detection threshold is greater than the lower mode signal detection threshold.

13. The apparatus of claim 9, wherein the one or more received signals include a first received satellite signal and a second received satellite signal, wherein the higher mode search is adapted to detect the first received satellite signal and the lower mode search is adapted to detect the second received satellite signal, and
further comprising means for processing location information adapted to dctcrrninc cross-correlation between the first received satellite signal and the second received satellite signal, and for processing process at least one of the first received satellite signal and the second received satellite signal to remove determined cross-correlation.

14. The apparatus of claim 9, further comprising means for performing a medium mode search using a medium mode search length and a medium mode signal detection threshold.

15. The apparatus of claim 9, wherein at least one of the means for performing a higher mode search or the means for performing a lower mode search is implemented using hardware, software, or both.

16. The apparatus of claim 9, wherein the means for determining cross correlation is adapted to determine cross correlation based, at least in part on:
comparing carrier-to-noise ratio measurements for signals of location information; and
identifying a weaker measurement as a cross correlation if a difference between the carrier-to-noise ratio measurements exceeds a predetermined carrier-to-noise threshold, and if a difference between Doppler measurements falls within a predetermined Doppler difference threshold.

17. A method, comprising:
receiving signals indicative of communication information and signals indicative of location information;
performing a higher mode search, for a first length of time, using a higher mode search length and a higher mode signal detection threshold to detect one or more received signals indicative of the location information;
performing a lower mode search after performance of the higher mode search, for a second length of time, using a lower mode search length and a lower mode signal detection threshold to detect one or more received signals indicative of the location information, wherein the second length of time is greater than the first length of time, the lower mode search being performed to detect one or more received signals not detected with a signal strength above a threshold level during the performance of the higher mode search; and determining cross correlation between at least one signal detected using the higher mode search and at least one signal detected using the lower mode search.

18. The method of claim 17, wherein the one or more received signals indicative of location information include a first satellite signal and a second satellite signal.

19. The method of claim 17, further comprising processing received cellular telephone signals.

20. The method of claim 17, wherein the higher mode signal detection threshold is greater than the lower mode signal detection threshold.

21. The method of claim 17, wherein the one or more received signals include a first received satellite signal and a second received satellite signal, wherein the higher mode search is adapted to detect the first received satellite signal and the lower mode search is adapted to detect the second received satellite signal, the method further comprising:
determining cross-correlation between the first received satellite signal and the second received satellite signal, and processing at least one of the first received satellite signal and the second received satellite signal to remove determined cross-correlation.

22. The method of claim 17, further comprising performing a medium mode search using a medium mode search length and a medium mode signal detection threshold.

23. The method of claim 17, further comprising utilizing hardware, software, or both, to process the location information.

24. The method of claim 17, further comprising:
comparing carrier-to-noise ratio measurements for signals of location information; and
identifying a weaker measurement as a cross correlation if a difference between the carrier-to-noise ratio measurements exceeds a predetermined carrier-to-noise threshold, and if a difference between Doppler measurements falls within a predetermined Doppler difference threshold.

25. An article comprising:
a storage medium comprising machine-readable instructions stored thereon which, if executed by a processor, are adapted to enable the processor to:
perform a higher mode search of signals indicative of communication information and signals indicative of location information, for a first length of time, using a higher mode search length and a higher mode signal detection threshold to detect one or more received signals indicative of location information;
perform a lower mode search after performance of the higher mode search, for a second length of time, using a lower mode search length and a lower mode signal detection threshold to detect one or more received signals indicative of location information, wherein the second length of time is greater than the first length of time, the lower mode search being performed to detect one or more received signals not detected with a signal strength above a threshold level during the performance of the higher mode search; and
determine cross correlation between at least one signal detected using the higher mode search and at least one signal detected using the lower mode search.

26. The article of claim 25, wherein the one or more received signals indicative of location information include a first satellite signal and a second satellite signal.

27. The article of claim 25, wherein the machine-readable instructions, if executed by the processor, are further adapted to enable the processor to process received cellular telephone signals.

28. The article of claim 25, wherein the machine-readable instructions, if executed by the processor, are further adapted to enable the processor to utilize a higher mode signal detection threshold that is greater than the lower mode signal detection threshold.

29. The article of claim 25, wherein the one or more received signals include a first received satellite signal and a second received satellite signal, wherein the higher mode search is adapted to detect the first received satellite signal and the lower mode search is adapted to detect the second received satellite signal, the machine-readable instructions, if executed by the processor, being further adapted to enable the computing platform processor to:
determine cross-correlation between the first received satellite signal and the second received satellite signal, and process at least one of the first received satellite signal and the second received satellite signal to remove determined cross-correlation.

30. The article of claim 25, wherein the machine-readable instructions, if executed by the processor, are further adapted to direct the processor to perform a medium mode search using a medium mode search length and a medium mode signal detection threshold.

31. The article of claim 25, wherein the machine-readable instructions, if executed by the processor, are further adapted to direct the processor to utilize hardware, software, or both, to process the location information.

32. The article of claim 25, wherein the machine-readable instructions, if executed by the processor, are further adapted to direct the processor to:
compare carrier-to-noise ratio measurements for signals of location information; and
identify a weaker measurement as a cross correlation if a difference between the carrier-to-noise ratio measurements exceeds a predetermined carrier-to-noise threshold, and if a difference between Doppler measurements falls within a predetermined Doppler difference threshold.

* * * * *